US012428574B2

(12) United States Patent
Kishimoto et al.

(10) Patent No.: US 12,428,574 B2
(45) Date of Patent: Sep. 30, 2025

(54) (METH)ACRYLATE COMPOSITION

(71) Applicant: SAMSUNG ELECTRONICS CO., LTD., Suwon-si (KR)

(72) Inventors: Tadashi Kishimoto, Sagamihara (JP); Yuki Hirayama, Tokyo (JP); Tomohisa Goto, Sagamihara (JP); Teruaki Suzuki, Sagamihara (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 848 days.

(21) Appl. No.: 17/603,123

(22) PCT Filed: Apr. 9, 2020

(86) PCT No.: PCT/EP2020/060123
§ 371 (c)(1),
(2) Date: Oct. 12, 2021

(87) PCT Pub. No.: WO2020/208127
PCT Pub. Date: Oct. 15, 2020

(65) Prior Publication Data
US 2022/0204797 A1 Jun. 30, 2022

(30) Foreign Application Priority Data
Apr. 12, 2019 (EP) .................... 19168902

(51) Int. Cl.
| C09D 11/50 | (2014.01) |
| B82Y 20/00 | (2011.01) |
| C09D 11/037 | (2014.01) |
| C09D 11/101 | (2014.01) |
| C09D 11/107 | (2014.01) |
| C09D 11/322 | (2014.01) |
| C09K 11/88 | (2006.01) |

(52) U.S. Cl.
CPC ............ *C09D 11/50* (2013.01); *C09D 11/037* (2013.01); *C09D 11/101* (2013.01); *C09D 11/107* (2013.01); *C09D 11/322* (2013.01); *C09K 11/883* (2013.01); *B82Y 20/00* (2013.01)

(58) Field of Classification Search
None
See application file for complete search history.

(56) References Cited

U.S. PATENT DOCUMENTS

| 10,700,133 | B2 | 6/2020 | Kim et al. |
| 10,804,417 | B2 | 10/2020 | Pschenitzka et al. |
| 10,947,403 | B2 | 3/2021 | Isonaka et al. |
| 2014/0027673 | A1 | 1/2014 | Nick et al. |
| 2017/0190965 | A1* | 7/2017 | Budd ................ C09K 11/02 |
| 2018/0102449 | A1 | 4/2018 | Pschenitzka et al. |
| 2018/0123085 | A1* | 5/2018 | Kakishita ............ G02F 1/01708 |
| 2018/0158880 | A1 | 6/2018 | Kim et al. |

FOREIGN PATENT DOCUMENTS

| CN | 104662123 A | 5/2015 |
| CN | 105694590 A | 6/2016 |
| CN | 109021702 A | 12/2018 |
| CN | 109354924 A | 2/2019 |
| CN | 109535836 A | 3/2019 |
| JP | 2008001746 A | 1/2008 |
| JP | 2009-96985 A | 5/2009 |
| JP | 2017-122206 A | 7/2017 |
| JP | 2018-162415 A | 10/2018 |
| JP | 2019-532473 A | 11/2019 |
| JP | 2019-212399 A | 12/2019 |
| JP | 2020-012048 A | 1/2020 |
| JP | 2021-017483 A | 2/2021 |
| KR | 2016-150256 A | 12/2016 |
| WO | 2017054898 A1 | 4/2017 |
| WO | 2017-200031 A1 | 11/2017 |
| WO | 2018123821 A1 | 7/2018 |
| WO | 2019002239 A1 | 1/2019 |

OTHER PUBLICATIONS

International Search Report dated Aug. 11, 2020 issued in corresponding PCT/EP2020/060123 application (5 pages).
Office Action in corresponding CN 202080027809.7 dated Jun. 26, 2023 (pp. 1-9) and English translation thereof (pp. 1-9).
Search Report dated Oct. 10, 2022 issued in corresponding CN Application No. 202080027809.7 (1-10 pages).
Office Action in corresponding JP 2021-559966 dated Mar. 13, 2024 (pp. 1-13).
Korean Notice of Patent Grant issued Aug. 20, 2025, in Korean Application No. 10-2021-7036517.

* cited by examiner

*Primary Examiner* — Catherine S Branch
(74) *Attorney, Agent, or Firm* — Sughrue Mion, PLLC

(57) ABSTRACT

The present invention relates to a composition comprising a (meth)acrylate monomer.

13 Claims, No Drawings

(METH)ACRYLATE COMPOSITION

FIELD OF THE INVENTION

The present invention relates to a composition comprising at least one (meth)acrylate monomer, use of a composition, an optical element, and an optical device.

BACKGROUND ART

WO 2017/054898 A1 describes a composition comprising red emission type nanocrystals, wetting and dispersing agent, propylene glycol monomethyl ether acetate as a solvent, an acryl polymer mixture including an acrylic unit including an acid group and a silane modified acrylic unit.

WO 2019/002239 A1 discloses a composition comprising a semiconducting light emitting nanoparticles, a polymer and a (meth)acrylate such as 1.4. cyclohexanedimethanol-monoacrylate having high viscosity around 90 cp.

Patent Literature

1. WO 2017/054898 A1
2. WO 2019/002239 A1

SUMMARY OF THE INVENTION

However, the inventors newly have found that there are still one or more of considerable problems for which improvement is desired, as listed below.

improved homogeneous dispersion of semiconducting light emitting nanoparticles in the composition, improved homogeneous dispersion of scattering particles in the composition, preferably improved homogeneous dispersion of both semiconducting light emitting nanoparticles and scattering particles, more preferably improved homogeneous dispersion of semiconducting light emitting nanoparticles and/or scattering particles without solvent; composition having lower viscosity suitable for inkjet printing, preferably a composition which can keep lower viscosity even if it is mixed with high loading of semiconducting light emitting nanoparticles and/or scattering particles, even more preferably without solvent; composition having lower vaper pressure for large area uniform printing; improved QY of semiconducting light emitting nanoparticles in the composition, improved QY of semiconducting light emitting nanoparticles after printing; improved thermal stability; easy printing without clogging at a printing nozzle; easy handling of the composition, improved printing properties; simple fabrication process; improved absorbance of blue light; improved solidity of a later made from the composition after inkjet printing.

The inventors aimed to solve one or more of the above-mentioned problems.

Then it was found a novel composition comprising, essentially consisting of or consisting of;

i) at least one (meth)acrylate monomer represented by following chemical formula (I) having viscosity of 25 cP or less at 25° C., preferably in the range from 1 to 25 cP, more preferably from 2 to 20 cP, even more preferably from 2 to 10 cP.

According to the present invention, said viscosity can be measured by vibration type viscometer VM-10A (SEKONIC) at room temperature. https://www.sekonic-.co.jp/english/product/viscometer/vm/vm_series.html

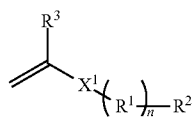

wherein $X^1$ is

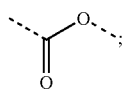

$R^1$ is a straight alkylene chain or alkoxylene chain having 1 to 15 carbon atoms, preferably 1 to 10 carbon atoms, more preferably 1 to 5 carbon atoms;

n is 0 or 1;

$R^2$ is a branched or cyclic alkyl or alkoxy group having 3 to 40 carbon atoms, an aromatic or heteroaromatic ring system having 5 to 60 aromatic ring atoms, which may be substituted by one or more radicals $R^a$; preferably said cyclic alkyl or alkoxy group is a cyclic alkyl or alkoxy group having 3 to 40 carbon atoms, which may in each case be substituted by one or more radicals $R^a$, where one or more non-adjacent $CH_2$ groups may be replaced by $R^aC=CR^a$, $C\equiv C$, $Si(R^a)_2$, $Ge(R^a)_2$, $Sn(R^a)_2$, $C=O$, $C=S$, $C=Se$, $C=NR^a$, $P(=O)(R^a)$, SO, SO2, $NR^a$, OS, or $CONR^a$ and where one or more H atoms may be replaced by D, F, Cl, Br, I, CN or $NO_2$;

$R^a$ is at each occurrence, identically or differently, H, D, or an alkyl group having 1 to 20 carbon atoms, cyclic alkyl or alkoxy group having 3 to 40 carbon atoms, an aromatic ring system having 5 to 60 carbon ring atoms, or a hetero aromatic ring system having 5 to 60 carbon atoms, wherein H atoms may be replaced by D, F, Cl, Br, I; two or more adjacent substituents $R^a$ here may also form a mono- or polycyclic, aliphatic, aromatic or heteroaromatic ring system with one another;

$R^3$ is H or $CH_3$; and ii) another material.

In another aspect, the present invention also relates to a composition comprising, essentially consisting of or consisting of;

i) at least one (meth)acrylate monomer represented by following chemical formula (I), preferably said (meth)acrylate monomer has the viscosity of 25 cP or less at room temperature, preferably in the range from 1 to 25 cP, more preferably from 2 to 20 cP, even more preferably from 2 to 10 cP;

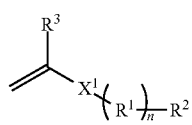

wherein $X^1$ is

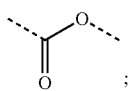

$R^1$ is a straight alkylene chain or alkoxylene chain having 1 to 15 carbon atoms, preferably 1 to 10 carbon atoms, more preferably 1 to 5 carbon atoms;
n is 0 or 1;
$R^2$ is a branched or cyclic alkyl or alkoxy group having 3 to 40 carbon atoms, an aromatic or heteroaromatic ring system having 5 to 60 aromatic ring atoms, which may be substituted by one or more radicals $R^a$; preferably said cyclic alkyl or alkoxy group is a cyclic alkyl or alkoxy group having 3 to 40 carbon atoms, which may in each case be substituted by one or more radicals $R^a$, where one or more non-adjacent $CH_2$ groups may be replaced by $R^aC=CR^a$, $C\equiv C$, $Si(R^a)_2$, $Ge(R^a)_2$, $Sn(R^a)_2$, $C=O$, $C=S$, $C=Se$, $C=NR^a$, $P(=O)(R^a)$, SO, SO2, $NR^a$, OS, or $CONR^a$ and where one or more H atoms may be replaced by D, F, Cl, Br, I, CN or $NO_2$;
$R^a$ is at each occurrence, identically or differently, H, D, or an alkyl group having 1 to 20 carbon atoms, cyclic alkyl or alkoxy group having 3 to 40 carbon atoms, an aromatic ring system having 5 to 60 carbon ring atoms, or a hetero aromatic ring system having 5 to 60 carbon atoms, wherein H atoms may be replaced by D, F, Cl, Br, I; two or more adjacent substituents $R^a$ here may also form a mono- or polycyclic, aliphatic, aromatic or heteroaromatic ring system with one another;
$R^3$ is H or $CH_3$,
Such as

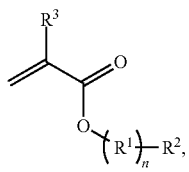

(I)

vi) a (meth)acrylate monomer represented by following chemical formula (II)

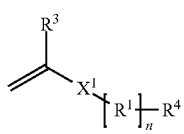

(II)

wherein
$X^1$ is

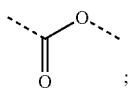

$R^1$ is a straight alkylene chain or alkoxylene chain having 1 to 15 carbon atoms, preferably 1 to 10 carbon atoms, more preferably 1 to 5 carbon atoms;
n is 0 or 1;
$R^3$ is H or $CH_3$;
$R^4$ is a straight alkyl group having 1 to 25 carbon atoms, preferably 5 to 20 carbon atoms, more preferably 10 to 15 carbon atoms; or alkoxyl group having 1 to 25 carbon atoms, preferably 5 to 20 carbon atoms, more preferably 10 to 15 carbon atoms.

In another aspect, the present invention further relates to a composition comprising, essentially consisting of or consisting of;
i) at least one (meth)acrylate monomer represented by following chemical formula (I), preferably said (meth)acrylate monomer has the viscosity of 25 cP or less at room temperature, preferably in the range from 1 to 25 cP, more preferably from 2 to 20 cP, even more preferably from 2 to 10 cP;

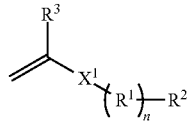

(I)

wherein
$X^1$ is

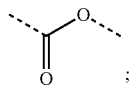

wherein
$R^1$ is a straight alkylene chain or alkoxylene chain having 1 to 15 carbon atoms, preferably 1 to 10 carbon atoms, more preferably 1 to 5 carbon atoms;
n is 0 or 1;
$R^2$ is a branched or cyclic alkyl or alkoxy group having 3 to 40 carbon atoms, an aromatic or heteroaromatic ring system having 5 to 60 aromatic ring atoms, which may be substituted by one or more radicals $R^a$;
preferably said cyclic alkyl or alkoxy group is a cyclic alkyl or alkoxy group having 3 to 40 carbon atoms, which may in each case be substituted by one or more radicals $R^a$, where one or more non-adjacent $CH_2$ groups may be replaced by $R^aC=CR^a$, $C\equiv C$, $Si(R^a)_2$, $Ge(R^a)_2$, $Sn(R^a)_2$, $C=O$, $C=S$, $C=Se$, $C=NR^a$, $P(=O)(R^a)$, SO, SO2, $NR^a$, OS, or $CONR^a$ and where one or more H atoms may be replaced by D, F, Cl, Br, I, CN or $NO_2$;
$R^a$ is at each occurrence, identically or differently, H, D, or an alkyl group having 1 to 20 carbon atoms, cyclic alkyl or alkoxy group having 3 to 40 carbon atoms, an aromatic ring system having 5 to 60 carbon ring atoms, or a hetero aromatic ring system having 5 to 60 carbon atoms, wherein H atoms may be replaced by D, F, Cl, Br, I; two or more adjacent substituents $R^a$ here may also form a mono- or polycyclic, aliphatic, aromatic or heteroaromatic ring system with one another; $R^3$ is H or $CH_3$;
iv) at least one polymer,
wherein the polymer comprises at least a repeating unit A comprising a phosphine group, phosphine oxide group, phosphate group, phosphonate group, thiol group, tertiary amine, carboxyl group, hetero cyclic group, silane group, sulfonic acid, hydroxyl group, phosphonic acid, or a combination of thereof, preferably the repeating unit A comprises a tertiary amine, phosphine oxide group, phosphonic acid, or a phosphate group; and v') a scattering particle, preferably said scattering particle is selected from one or more members of the group consisting of inorganic oxide particles such as $SiO_2$, $SnO_2$, CuO, CoO, $Al_2O_3$ $TiO_2$, $Fe_2O_3$, $Y_2O_3$, ZnO, ZnS, MgO particles or organic particles such as polymerized polystyrene, polymerized PMMA particles, and inorganic hollow oxide particles such as hollow silica, more preferably it is a $TiO_2$ particle, even more preferably the average diameter of the particle is in the range from 0.25 to 0.20 μm.

In another aspect, the present invention also relates to use of the composition of the present invention in an electronic device, optical device, sensing device or in a biomedical device or for fabricating an electronic device, sensing device, optical device or a biomedical device.

In another aspect, the present invention further relates to an optical element made from the composition.

In another aspect, the present invention further relates to an optical device comprising one or more of said optical element.

DETAILED DESCRIPTION OF THE INVENTION

According to the present invention, in one aspect (the first aspect), the composition comprising, essentially consisting of, or consisting of, i) at least one (meth)acrylate monomer represented by following chemical formula (I) having viscosity of 25 cP or less at 25° C., preferably in the range from 1 to 25 cP, more preferably from 2 to 20 cP, even more preferably from 2 to 10 cP;

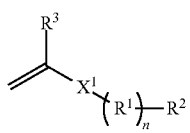
(I)

wherein
$X^1$ is

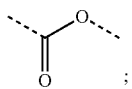
;

$R^1$ is a straight alkylene chain or alkoxylene chain having 1 to 15 carbon atoms, preferably 1 to 10 carbon atoms, more preferably 1 to 5 carbon atoms;
n is 0 or 1;
$R^2$ is a branched or cyclic alkyl or alkoxy group having 3 to 40 carbon atoms, an aromatic or heteroaromatic ring system having 5 to 60 aromatic ring atoms, which may be substituted by one or more radicals $R^a$; preferably said cyclic alkyl or alkoxy group is a cyclic alkyl or alkoxy group having 3 to 40 carbon atoms, which may in each case be substituted by one or more radicals $R^a$, where one or more non-adjacent $CH_2$ groups may be replaced by $R^aC=CR^a$, $C\equiv C$, $Si(R^a)_2$, $Ge(R^a)_2$, $Sn(R^a)_2$, C=O, C=S, C=Se, C=$NR^a$, P(=O)($R^a$), SO, SO2, $NR^a$, OS, or $CONR^a$ and where one or more H atoms may be replaced by D, F, Cl, Br, I, CN or $NO_2$;

$R^a$ is at each occurrence, identically or differently, H, D, or an alkyl group having 1 to 20 carbon atoms, cyclic alkyl or alkoxy group having 3 to 40 carbon atoms, an aromatic ring system having 5 to 60 carbon ring atoms, or a hetero aromatic ring system having 5 to 60 carbon atoms, wherein H atoms may be replaced by D, F, Cl, Br, I; two or more adjacent substituents $R^a$ here may also form a mono- or polycyclic, aliphatic, aromatic or heteroaromatic ring system with one another;

$R^3$ is H or $CH_3$; and
ii) another material.

(Meth)acrylate monomer represented by chemical formula (I) as a matrix material

According to the present invention, the (meth)acrylate monomer represented by the chemical formula (I) has the viscosity of 25 cP or less at 25° C., preferably in the range from 1 to 25 cP, more preferably from 2 to 20 cP, even more preferably from 2 to 10 cP.

It is believed that the lower viscosity is important to make a low viscosity composition suitable for inkjet printing. Therefore, a (meth)acrylate monomer having the viscosity value within the above-mentioned parameter ranges are especially suitable to make a composition for inkjet printing. By using these (meth)acrylate monomer in a composition, when it is mixed with another material such as semiconducting light emitting nanoparticles with high loading, the composition can still keep lower viscosity within the range suitable for inkjet printing.

In a preferred embodiment of the present invention, the boiling point (B.P.) of said (meth)acrylate monomer is 180° C. or more, preferably it is in the range from 180° C. to 350° C., more preferably from 250° C. to 350° C.

It is believed that said high boiling point is also important to make a composition having a lower vapor pressure preferably less than 0.001 mmHg for large area uniform printing, it is preferable to use a (meth)acrylate monomer of formula (I) having the viscosity value of 25 cP or less at 25° C. and the boiling point at least 180° C. or more, preferably more than 180° C. to make a composition suitable for large area uniform inkjet printing even if it is mixed with high loading of another materials such as high loading of semiconducting light emitting nanoparticles.

According to the present invention, any types of publicly available acrylates and/or methacrylates represented by chemical formula (I) can be used preferably.

Especially for the first aspect, any types of publicly available acrylates and/or methacrylates having the viscosity value of 25 cP or less at 25° C. represented by chemical formula (I) can be used.

Furthermore preferably, said $R^2$ of formula (I) is, at each occurrence, independently or differently, selected from the following groups, wherein the groups can be substituted with $R^a$, preferably they are unsubstituted by $R^a$.

*—(CH$_2$)$_6$—CH$_3$  *—(CH$_2$)$_7$—CH$_3$  *—(CH$_2$)$_8$—CH$_3$
*—(CH$_2$)$_9$—CH$_3$  *—(CH$_2$)$_{10}$—CH$_3$  *—(CH$_2$)$_{11}$—CH$_3$
*—(CH$_2$)$_{12}$—CH$_3$  *—(CH$_2$)$_4$—OH  *—(CH$_2$)$_2$—OH
*—(CH$_2$)$_6$—OH  *—(CH$_2$)$_3$—OH  *—(CH$_2$)$_5$—OH
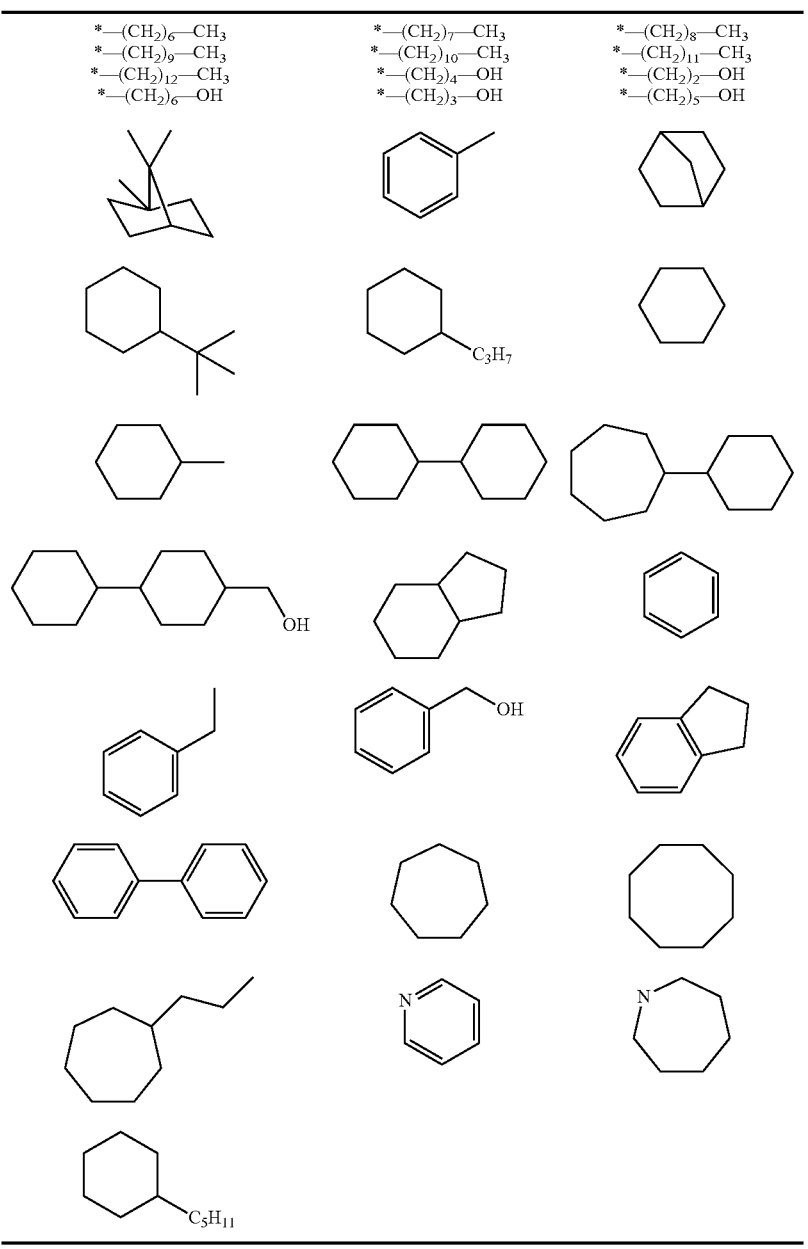
Particularly preferably, said R$^2$ of formula (I) is, at each occurrence, independently or differently, selected from the following groups.
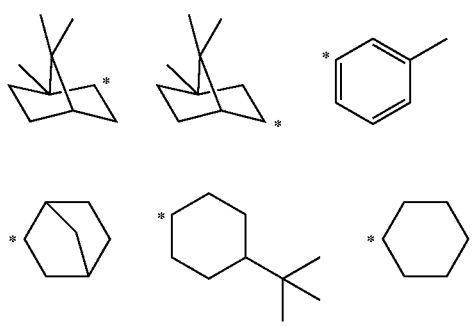
-continued
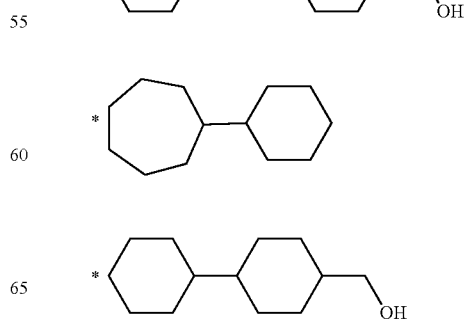

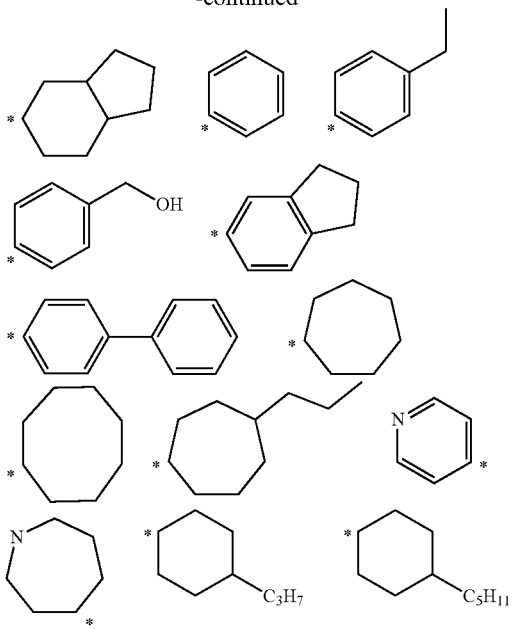

wherein "*" represents the connecting point to $R^1$ in case n is 1, and it is representing the connecting point to oxygen atom of the formulae in case n is 0.

Furthermore preferably, said formula (I) is cyclohexyl methacrylate (CHMA, BP:210° C.), 4-tert-butylcyclohexyl acrylate (TBCH, BP:253) or phenoxyethyl acrylate (PEA, BP: 295° C.).

In another aspect (the second aspect) of the present invention, a composition comprises, essentially consisting of or consisting of;
i) at least one (meth)acrylate monomer represented by following chemical formula (I), preferably said (meth) acrylate monomer has the viscosity of 25 cP or less at room temperature, preferably in the range from 1 to 25 cP, more preferably from 2 to 20 cP, even more preferably from 2 to 10 cP;

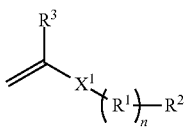

(I)

wherein
$X^1$ is

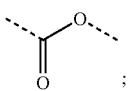

$R^1$ is a straight alkylene chain or alkoxylene chain having 1 to 15 carbon atoms, preferably 1 to 10 carbon atoms, more preferably 1 to 5 carbon atoms;
n is 0 or 1;
$R^2$ is a branched or cyclic alkyl or alkoxy group having 3 to 40 carbon atoms, an aromatic or heteroaromatic ring system having 5 to 60 aromatic ring atoms, which may be substituted by one or more radicals $R^a$;
preferably said cyclic alkyl or alkoxy group is a cyclic alkyl or alkoxy group having 3 to 40 carbon atoms, which may in each case be substituted by one or more radicals $R^a$, where one or more non-adjacent $CH_2$ groups may be replaced by $R^aC=CR^a$, $C\equiv C$, $Si(R^a)_2$, $Ge(R^a)_2$, $Sn(R^a)_2$, $C=O$, $C=S$, $C=Se$, $C=NR^a$, $P(=O)(R^a)$, SO, SO2, $NR^a$, OS, or $CONR^a$ and where one or more H atoms may be replaced by D, F, Cl, Br, I, CN or $NO_2$;
$R^a$ is at each occurrence, identically or differently, H, D, or an alkyl group having 1 to 20 carbon atoms, cyclic alkyl or alkoxy group having 3 to 40 carbon atoms, an aromatic ring system having 5 to 60 carbon ring atoms, or a hetero aromatic ring system having 5 to 60 carbon atoms, wherein H atoms may be replaced by D, F, Cl, Br, I; two or more adjacent substituents $R^a$ here may also form a mono- or polycyclic, aliphatic, aromatic or heteroaromatic ring system with one another; $R^3$ is H or $CH_3$,
vi) a (meth)acrylate monomer represented by following chemical formula (II)

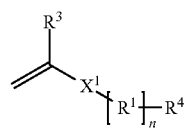

(II)

wherein
$X^1$ is

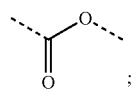

$R^1$ is a straight alkylene chain or alkoxylene chain having 1 to 15 carbon atoms, preferably 1 to 10 carbon atoms, more preferably 1 to 5 carbon atoms;
n is 0 or 1;
$R^3$ is H or $CH_3$;
$R^4$ is a straight alkyl group having 1 to 25 carbon atoms, preferably 5 to 20 carbon atoms, more preferably 10 to 15 carbon atoms; or alkoxyl group having 1 to 25 carbon atoms, preferably 5 to 20 carbon atoms, more preferably 10 to 15 carbon atoms.
Such as

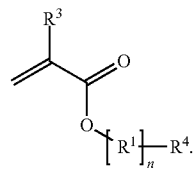

(II)

(Meth)acrylate monomer represented by chemical formula (II) It is believed that the (meth)acrylate monomer represented by following chemical formula (II) shows much lower viscosity value than the viscosity of the (meth)acrylate monomer of formula (I). Thus, by using the (meth)acrylate monomer represented by chemical formula (II) in combination of the (meth)acrylate monomer of chemical formula (I), a composition having much lower viscosity desirable for smooth inkjet printing can be realized.

It is believed that said combination can realize a low viscosity composition comprising high amount of another materials, such as high loading of semiconducting light emitting nanoparticles. Thus, it is especially suitable for an inkjet printing when the composition comprises another material.

In a preferable embodiment of the present invention, the mixing weight ratio of the (meth)acrylate monomer of chemical formula (I) to the (meth)acrylate monomer of chemical formula (II) in the composition is in the range from 11:89 to 99:1, preferably from 20:80 to 90:10.

In a preferable embodiment of the present invention, the boiling point (B.P.) of said (meth)acrylate monomer of chemical formula (I) and/or the boiling point (B.P.) of said (meth)acrylate monomer of chemical formula (II) is 118° C. or more, preferably it is in the range from 118° C. to 350° C., more preferably from 120° C. to 350° C., even more preferably from 140° C. to 350° C. for large area uniform inkjet printing. Even more preferably, the boiling point (B.P.) of said (meth)acrylate monomer of chemical formula (I) and the boiling point (B.P.) of said (meth)acrylate monomer of chemical formula (II) are both 120° C. or more.

Furthermore preferably, said $R^4$ of formula (II) is, at each occurrence, independently or differently, selected from the following groups, wherein the groups can be substituted with $R^a$, preferably they are unsubstituted by $R^a$.

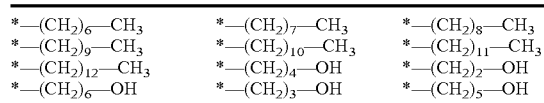

wherein "*" represents the connecting point to R in case n is 1, and it is representing the connecting point to oxygen atom of the formulae in case n is 0.

The furthermore preferably, said formula (I) is Lauryl methacrylate (LM, viscosity 6 cP, BP: 142° C.), Lauryl acrylate (LA, viscosity: 4.0 cP, BP: 313.2° C.).

According to the present invention, preferably the composition further comprises an another material selected from one or more members of the group consisting of;

iii) at least one semiconducting light emitting nanoparticle comprising a $1^{st}$ semiconducting nanoparticle, optionally one or more shell layers covering at least a part of the $1^{st}$ semiconducting nanoparticle;

iv) at least one polymer, wherein the polymer comprises at least a repeating unit A comprising a phosphine group, phosphine oxide group, phosphate group, phosphonate group, thiol group, tertiary amine, carboxyl group, hetero cyclic group, silane group, sulfonic acid, hydroxyl group, phosphonic acid, or a combination of thereof, preferably the repeating unit A comprises a tertiary amine, phosphine oxide group, phosphonic acid, or a phosphate group;

v) scattering particles, optically transparent polymers, anti-oxidants, radical quenchers, photo initiators and surfactants.

Polymer

According to the present invention, the polymer comprises at least a repeating unit A comprising a phosphine group, phosphine oxide group, phosphate group, phosphonate group, thiol group, tertiary amine, carboxyl group, hetero cyclic group, silane group, sulfonic acid, hydroxyl group, phosphonic acid, or a combination of thereof, preferably the repeating unit A comprises a tertiary amine, phosphine oxide group, phosphonic acid, or a phosphate group.

In some embodiments of the present invention, the repeating unit A and the repeating unit B are a constitutional repeating unit.

Even more preferably, the repeating unit A comprises a tertiary amine represented by following chemical formula (VII), $$NR^4R^5R^6— \quad (VII)$$

wherein $R^4$ is a hydrogen atom, a straight or a branched alkyl group having 1 to 30 carbon atoms, or an aryl group having 1 to 30 carbon atoms; $R^5$ is a hydrogen atom, a straight or a branched alkyl group having 1 to 30 carbon atoms, or an aryl group having 1 to 30 carbon atoms; $R^4$ and $R^5$ can be same or different of each other; $R^6$ is a single bond, a straight or a branched alkylene group having 1 to 30 carbon atoms, alkenylene group having 1 to 30 carbon atoms, (poly)oxaalkylene group having 1 to 30 carbon atoms.

Even more preferably, $R^4$ is a straight or a branched alkyl group having 1 to 30 carbon atoms; $R^5$ is a straight or a branched alkyl group having 1 to 30 carbon atoms; $R^4$ and $R^5$ can be same or different of each other.

Furthermore preferably, $R^4$ is methyl group, ethyl group, n-propyl group, or n-butyl group; $R^5$ is methyl group, ethyl group, n-propyl group, or n-butyl group.

According to the present invention, in a preferred embodiment, the repeating unit A does not contain a salt.

In a preferred embodiment of the present invention, the polymer is a copolymer selected from the group consisting of graft copolymers, block copolymers, alternating copolymers, and random copolymers, preferably said copolymer comprises the repeating unit A, and repeating unit B that does not include any phosphine group, phosphine oxide group, phosphate group, phosphonate group, thiol group, tertiary amine, carboxyl group, hetero cyclic group, silane group, sulfonic acid, hydroxyl group, phosphonic acid, and a combination of thereof, more preferably the copolymer is a block copolymer represented by following chemical formula (VIII) or (IX), $$A_n\text{-}B_m \quad (VIII)$$

$$B_o\text{-}A_n\text{-}B_m \quad (IX)$$

wherein the symbol "A" represents a repeating unit A; the symbol "B" is taken to mean the repeating unit B; the symbols "n", "m", and "o" are at each occurrence, independently or dependently of each other, integers 1 to 100, preferably 5 to 75, more preferably 7 to 50; even more preferably the repeating unit B comprises a polymer chain selected from the group consisting of (poly)ethylene, (poly)phenylene, polydivinylbenzene, (poly)ethers, (poly)esters, (poly)amides, (poly)urethanes, (poly)carbonates, polylactic acids, (poly)vinyl esters, (poly)vinyl ethers, polyvinyl alcohols, polyvinylpyrrolidones, celluloses and derivatives of any of these.

In a preferred embodiment of the present invention, the polymer chain of the repeating unit B is a polyethylene glycol.

More preferably, the repeating unit B comprises a chemical structure represented by following chemical formula (X), Chemical formula (X)

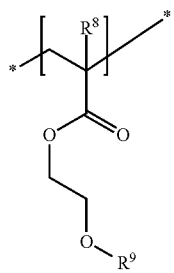

wherein the chemical formula (X), $R^8$ is hydrogen atom, or methyl group; $R^9$ is alkyl group having 1 to 10 carbon atoms; and n is an integer 1 to 5, "*" represents the connecting point to an another polymer repeating unit or a terminal of the polymer.

Even more preferably, $R^8$ can be a hydrogen atom, or methyl group, $R^9$ can be an ethyl group, and n is an integer 1 to 5.

In some embodiments of the present invention, the surface of the core, or the outermost surface of one or more shell layers of the semiconducting light emitting nanoparticle can be partly or fully over coated by the polymer. By using ligand exchange method, described in for example, Thomas Nann, Chem. Commun., 2005, 1735-1736, DOI: 10.1039/b-414807j, the polymer can be introduced onto the surface of the core or the outermost surface of the core of the semiconducting light emitting nanoparticle.

In some embodiments of the present invention, at least one polymer represented by chemical formula (X) are physically or chemically can be attached onto the surface of the core or the outermost surface of the shell layers, preferably a plurality of polymers is attached onto the surface of the core or the outermost surface of the shell layers.

According to the present invention, in some embodiments, the content of said polymer is in the range from 1% to 500% by weight, more preferably in the range from 20% to 350% by weight, even more preferably from 50% to 200% by weight with respect to the total weight of the inorganic part of the semiconducting light emitting nanoparticle.

In a preferred embodiment of the present invention, the weight average molecular weight (Mw) of the polymer is in the range from 200 g/mol to 30,000 g/mol, preferably from 250 g/mol to 2,000 g/mol, more preferably from 400 g/mol to 1,000 g/mol.

The molecular weight $M_w$ is determined by means of GPC (=gel permeation chromatography) against an internal polystyrene standard.

As the polymer, commercially available wetting and dispersing additives which can be solved in non-polar and/or low polar organic solvent can be used preferably. Such as BYK-111, BYK-LPN6919, BYK-103, BYK-P104, BYK-163 ([trademark], from BYK com.), TERPLUS MD1000 series, such as MD1000, MD1100 ([trademark], from Otsuka Chemical), Poly(ethylene glycol) methyl ether amine (Sigma-Ald 767565 [trademark], from Sigma Aldrich), Polyester bis-MPA dendron, 32 hydroxyl, 1 thiol, (Sigma-Ald 767115 [trademark], from Sigma Aldrich), LIPONOL DA-T/25 (From Lion Specialty Chemicals Co.), Carboxymethyl cellulose (from Polyscience etc.), another wetting and dispersing additives disclosed in for examples, "Marc Thiry et. al., ACSNANO, American Chemical society, Vol. 5, No. 6, pp 4965-4973, 2011", "Kimihiro Susumu, et. al., J. Am. Chem. Soc. 2011, 133, pp 9480-9496".

Semiconducting Light Emitting Nanoparticle

According to the present invention, the term "semiconductor" means a material that has electrical conductivity to a degree between that of a conductor (such as copper) and that of an insulator (such as glass) at room temperature. Preferably, a semiconductor is a material whose electrical conductivity increases with the temperature.

The term "nanosized" means the size in between 0.1 nm and 999 nm, preferably 1 nm to 150 nm, more preferably 3 nm to 50 nm.

Thus, according to the present invention, "semiconducting light emitting nanoparticle" is taken to mean that the light emitting material which size is in between 0.1 nm and 999 nm, preferably 1 nm to 150 nm, more preferably 3 nm to 50 nm, having electrical conductivity to a degree between that of a conductor (such as copper) and that of an insulator (such as glass) at room temperature, preferably, a semiconductor is a material whose electrical conductivity increases with the temperature, and the size is in between 0.1 nm and 999 nm, preferably 0.5 nm to 150 nm, more preferably 1 nm to 50 nm.

According to the present invention, the term "size" means the average diameter of the longest axis of the semiconducting nanosized light emitting particles.

The average diameter of the semiconducting nanosized light emitting particles is calculated based on 100 semiconducting light emitting nanoparticles in a TEM image created by a Tecnai G2 Spirit Twin T-12 Transmission Electron Microscope.

In a preferred embodiment of the present invention, the semiconducting light emitting nanoparticle of the present invention is a quantum sized material.

According to the present invention, the term "quantum sized" means the size of the semiconducting material itself without ligands or another surface modification, which can show the quantum confinement effect, like described in, for example, ISBN:978-3-662-44822-9.

For example, CdS, CdSe, CdTe, ZnS, ZnSe, ZnSeS, ZnTe, ZnO, GaAs, GaP, GaSb, HgS, HgSe, HgSe, HgTe, InAs, InP, InPZn, InPZnS, InPZnSe, InPZnSeS, InPZnGa, InPGaS, InPGaSe, InPGaSeS, InPZnGaSeS and InPGa, InCdP, InPCdS, InPCdSe, InSb, AlAs, AlP, AlSb, $Cu_2S$, $Cu_2Se$, CuInS2, $CuInSe_2$, $Cu_2(ZnSn)S_4$, $Cu_2(InGa)S_4$, $TiO_2$ alloys and a combination of any of these can be used.

In a preferred embodiment of the present invention, the $1^{st}$ semiconducting material comprises at least one element of the group 13 of the periodic table, and one element of the group 15 of the periodic table, preferably the element of the group 13 is In, and the element of the group 15 is P, more preferably the $1^{st}$ semiconducting material is selected from the group consisting of InP, InPZn, InPZnS, InPZnSe, InPZnSeS, InPZnGa, InPGaS, InPGaSe, InPGaSeS, InPZnGaSeS and InPGa.

According to the present invention, a type of shape of the core of the semiconducting light emitting nanoparticle, and shape of the semiconducting light emitting nanoparticle to be synthesized are not particularly limited.

For examples, spherical shaped, elongated shaped, star shaped, polyhedron shaped, pyramidal shaped, tetrapod shaped, tetrahedron shaped, platelet shaped, cone shaped, and irregular shaped core and—or a semiconducting light emitting nanoparticle can be synthesized.

In some embodiments of the present invention, the average diameter of the core is in the range from 1.5 nm to 3.5 nm.

The average diameter of the core is calculated based on 100 semiconducting light emitting nanoparticles in a TEM image created by a Tecnai G2 Spirit Twin T-12 Transmission Electron Microscope.

In some embodiments of the present invention, at least one the shell layer comprises or a consisting of a $1^{st}$ element of group 12 of the periodic table and a $2^{nd}$ element of group 16 of the periodic table, preferably, the $1^{st}$ element is Zn, and the $2^{nd}$ element is S, Se, or Te; preferably a first shell layer covering directly onto said core comprises or a consisting of a $1^{st}$ element of group 12 of the periodic table and a $2^{nd}$ element of group 16 of the periodic table, preferably, the $1^{st}$ element is Zn, and the $2^{nd}$ element is S, Se, or Te.

In a preferred embodiment of the present invention, at least one shell layer (a first shell layer) is represented by following formula (XI), preferably the shell layer directly covering the core is represented by the chemical formula (XI);

$$ZnS_xSe_yTe_z \quad (XI)$$

wherein $0 \leq x \leq 1$, $0 \leq y \leq 1$, $0 \leq z \leq 1$, and $x+y+z=1$, preferably $0 \leq x \leq 1$, $0 \leq y \leq 1$, $z=0$, and $x+y=1$, preferably, the shell layer is ZnSe, $ZnS_xSe_y$, $ZnSe_yTe_z$ or $ZnS_xTe_z$.

In some embodiments of the present invention, said shell layer is an alloyed shell layer or a graded shell layer, preferably said graded shell layer is $ZnS_xSe_y$, $ZnSe_yTe_z$, or $ZnS_xTe_z$, more preferably it is $ZnS_xSe_y$.

In some embodiments of the present invention, the semiconducting light emitting nanoparticle further comprises $2^{nd}$ shell layer onto said shell layer, preferably the $2^{nd}$ shell layer comprises or a consisting of a $3^{rd}$ element of group 12 of the periodic table and a $4^{th}$ element of group 16 of the periodic table, more preferably the $3^{rd}$ element is Zn, and the $4^{th}$ element is S, Se, or Te with the proviso that the $4^{th}$ element and the $2^{nd}$ element are not same.

In a preferred embodiment of the present invention, the $2^{nd}$ shell layer is represented by following formula (XI'),

$$ZnS_xSe_yTe_z \quad (XI')$$

wherei, $0 \leq x \leq 1$, $0 \leq y \leq 1$, $0 \leq z \leq 1$, and $x+y+z=1$, preferably, the shell layer is ZnSe, $ZnS_xSe_y$, $ZnSe_yTe_z$, or $ZnS_xTe_z$ with the proviso that the shell layer and the $2^{nd}$ shell layer is not the same.

In some embodiments of the present invention, said $2^{nd}$ shell layer can be an alloyed shell layer.

In some embodiments of the present invention, the semiconducting light emitting nanoparticle can further comprise one or more additional shell layers onto the $2^{nd}$ shell layer as a multishell.

According to the present invention, the term "multishell" stands for the stacked shell layers consisting of three or more shell layers.

For example, CdSe/CdS, CdSeS/CdZnS, CdSeS/CdS/ZnS, ZnSe/CdS, CdSe/ZnS, InP/ZnS, InP/ZnSe, InP/ZnSe/ZnS, InZnP/ZnS, InZnP/ZnSe, InZnP/ZnSe/ZnS, InGaP/ZnS, InGaP/ZnSe, InGaP/ZnSe/ZnS, InZnPS/ZnS, InZnPS ZnSe, InZnPS/ZnSe/ZnS, ZnSe/CdS, ZnSe/ZnS or combination of any of these, can be used. Preferably, InP/ZnS, InP/ZnSe, InP/ZnSe/ZnS, InZnP/ZnS, InZnP/ZnSe, InZnP/ZnSe/ZnS, InGaP/ZnS, InGaP/ZnSe, InGaP/ZnSe/ZnS.

Such semiconducting light emitting nanoparticles are publicly available (for example from Sigma Aldrich) and/or can be synthesized with the method described for example in U.S. Pat. Nos. 7,588,828 B, 8,679,543 B and Chem. Mater. 2015, 27, pp 4893-4898.

In some embodiments of the present invention, the composition comprises two or more semiconducting light emitting nanoparticles.

In some embodiments of the present invention, the composition comprises a plurality of semiconducting light emitting nanoparticles.

In some embodiments of the present invention, the total amount of the semiconducting light emitting nanoparticles is in the range from 0.1 wt. % to 90 wt. % based on the total amount of the composition, preferably from 10 wt. % to 70 wt. %, more preferably from 30 wt. % to 50 wt. %.

Ligands

In some embodiments of the present invention, optionally, the semiconducting light emitting nanoparticle can be directly over coated by one or more ligands, or the outer most surface of the inorganic part of the semiconducting light emitting nanoparticle can be directly coated by the additional ligand and the additional ligand is further coated by the polymer.

As the additional ligands, phosphines and phosphine oxides such as Trioctylphosphine oxide (TOPO), Trioctylphosphine (TOP), and Tributylphosphine (TBP); phosphonic acids such as Dodecylphosphonic acid (DDPA), Tridecylphosphonic acid (TDPA), Octadecylphosphonic acid (ODPA), and Hexylphosphonic acid (HPA); amines such as Oleylamine, Dedecyl amine (DDA), Tetradecyl amine (TDA), Hexadecyl amine (HDA), and Octadecyl amine (ODA), Oleylamine (OLA), 1-Octadecene (ODE), thiols such as hexadecane thiol and hexane thiol; mercapto carboxylic acids such as mercapto propionic acid and mercaptoundecanoicacid; carboxylic acids such as oleic acid, stearic acid, myristic acid; acetic acid, Polyethylenimine (PEI), monofunctional PEG thiol (mPEG-thiol) or a derivatives of mPEG thiol and a combination of any of these can be used.

Examples of such ligands have been described in, for example, the laid-open international patent application No. WO 2012/059931A.

Additional Material

In some embodiments of the present invention, said composition can further comprise at least a second additional material, preferably the $2^{nd}$ additional material is selected from the group consisting of organic light emitting materials, inorganic light emitting materials, charge transporting materials, scattering particles, optically transparent polymers, anti-oxidants, radical quenchers, radical quenchers, photo initiators and surfactants.

For example, said activator can be selected from the group consisting of $Sc^{3+}, Y^{3+}, La^{3+}, Ce^{3+}, Pr^{3+}, Nd^{3+}, Pm^{3+}, Sm^{3+}, Eu^{3+}, Gd^{3+}, Tb^{3+}, Dy^{3+}, Ho^{3+}, Er^{3+}, Tm^{3+}, Yb^{3+}, Lu^{3+}, Bi^{3+}, Pb^{2+}, Mn^{2+}, Yb^{2+}, Sm^{2+}, Eu^{2+}, Dy^{2+}, Ho^{2+}$ and a combination of any of these, and said inorganic fluorescent material can be selected from the group consisting of sulfides, thiogallates, nitrides, oxynitrides, silicate, aluminates, apatites, borates, oxides, phosphates, halophosphates, sulfates, tungstenates, tantalates, vanadates, molybdates, niobates, titanates, germinates, halides based phosphors, and a combination of any of these.

Such suitable inorganic fluorescent materials described above can be well known phosphors including nanosized phosphors, quantum sized materials like mentioned in the phosphor handbook, $2^{nd}$ edition (CRC Press, 2006), pp. 155-pp. 338 (W. M. Yen, S. Shionoya and H. Yamamoto), WO2011/147517A, WO2012/034625A, and WO2010/095140A.

According to the present invention, as said organic light emitting materials, charge transporting materials, any type of publicly known materials can be used preferably. For example, well known organic fluorescent materials, organic host materials, organic dyes, organic electron transporting materials, organic metal complexes, and organic hole transporting materials.

For examples of scattering particles, small particles of inorganic oxides such as $SiO_2$, $SnO_2$, CuO, CoO, $Al_2O_3$ $TiO_2$, $Fe_2O_3$, $Y_2O_3$, ZnO, ZnS, MgO; organic particles such as polymerized polystyrene, polymerized PMMA; inorganic hollow oxides such as hollow silica or a combination of any of these; can be used preferably.

According to the present invention, as a transparent polymer, a wide variety of publicly known transparent polymers suitable for optical devices, described in for example, WO 2016/134820A can be used preferably.

According to the present invention, the term "transparent" means at least around 60% of incident light transmit at the thickness used in an optical medium and at a wavelength or a range of wavelength used during operation of an optical medium. Preferably, it is over 70%, more preferably, over 75%, the most preferably, it is over 80%.

According to the present invention the term "polymer" means a material having a repeating unit and having the weight average molecular weight (Mw) 1000 g/mol, or more.

The molecular weight $M_w$ is determined by means of GPC (=gel permeation chromatography) against an internal polystyrene standard.

In some embodiments of the present invention, the glass transition temperature (Tg) of the transparent polymer is 70° C. or more and 250° C. or less.

Tg is measured based on changes in the heat capacity observed in Differential scanning colorimetry like described in http://psic.ws/macrog/dsc.htm; Rickey J Seyler, Assignment of the Glass Transition, ASTM publication code number (PCN) 04-012490-50.

For example, as the transparent polymer for the transparent matrix material, poly(meth)acrylates, epoxys, polyurethanes, polysiloxanes, can be used preferably.

In a preferred embodiment of the present invention, the weight average molecular weight (Mw) of the polymer as the transparent matrix material is in the range from 1,000 to 300,000 g/mol, more preferably it is from 10,000 to 250,000 g/mol.

In another aspect, the present invention further relates to a composition comprising, essentially consisting of or consisting of;
i) at least one (meth)acrylate monomer represented by following chemical formula (I), preferably said (meth) acrylate monomer has the viscosity of 25 cP or less at room temperature, preferably in the range from 1 to 25 cP, more preferably from 2 to 20 cP, even more preferably from 2 to 10 cP;

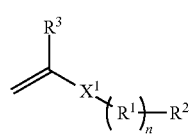
(I)

wherein $X^1$ is

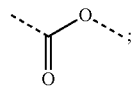

$R^1$ is a straight alkylene chain or alkoxylene chain having 1 to 15 carbon atoms, preferably 1 to 10 carbon atoms, more preferably 1 to 5 carbon atoms;
n is 0 or 1;
$R^2$ is a branched or cyclic alkyl or alkoxy group having 3 to 40 carbon atoms, an aromatic or heteroaromatic ring system having 5 to 60 aromatic ring atoms, which may be substituted by one or more radicals $R^a$;
preferably said cyclic alkyl or alkoxy group is a cyclic alkyl or alkoxy group having 3 to 40 carbon atoms, which may in each case be substituted by one or more radicals $R^a$, where one or more non-adjacent $CH_2$ groups may be replaced by $R^aC=CR^a$, $C\equiv C$, $Si(R^a)_2$, $Ge(R^a)_2$, $Sn(R^a)_2$, $C=O$, $C=S$, $C=Se$, $C=NR^a$, $P(=O)(R^a)$, SO, SO2, $NR^a$, OS, or $CONR^a$ and where one or more H atoms may be replaced by D, F, Cl, Br, I, CN or $NO_2$;
$R^a$ is at each occurrence, identically or differently, H, D, or an alkyl group having 1 to 20 carbon atoms, cyclic alkyl or alkoxy group having 3 to 40 carbon atoms, an aromatic ring system having 5 to 60 carbon ring atoms, or a hetero aromatic ring system having 5 to 60 carbon atoms, wherein H atoms may be replaced by D, F, Cl, Br, I; two or more adjacent substituents $R^a$ here may also form a mono- or polycyclic, aliphatic, aromatic or heteroaromatic ring system with one another;
$R^3$ is H or $CH_3$;
iv) at least one polymer,
wherein the polymer comprises at least a repeating unit A comprising a phosphine group, phosphine oxide group, phosphate group, phosphonate group, thiol group, tertiary amine, carboxyl group, hetero cyclic group, silane group, sulfonic acid, hydroxyl group, phosphonic acid, or a combination of thereof, preferably the repeating unit A comprises a tertiary amine, phosphine oxide group, phosphonic acid, or a phosphate group;
and
v') a scattering particle, preferably said scattering particle is selected from one or more members of the group consisting of inorganic oxide particles such as $SiO_2$, $SnO_2$, CuO, CoO, $Al_2O_3$ $TiO_2$, $Fe_2O_3$, $Y_2O_3$, ZnO, ZnS, MgO particles or organic particles such as polymerized polystyrene, polymerized PMMA particles, and inorganic hollow oxide particles such as hollow silica, more preferably it is a $TiO_2$ particle, even more preferably the average diameter of the particle is in the range from 0.25 to 0.20 μm.

In a preferred embodiment, the composition of first, second and third aspect of the present invention further comprises a (meth)acrylate monomer represented by following chemical formula (III);

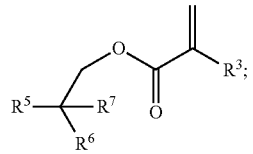
(III)

wherein $R^5$ is hydrogen atom, a straight alkyl group having 1 to 25 carbon atoms or a (meth)acryl group represented by chemical formula (IV)

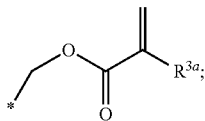
(IV)

$R^6$ is hydrogen atom, a straight alkyl group having 1 to 25 carbon atoms or a (meth)acryl group represented by chemical formula (V)

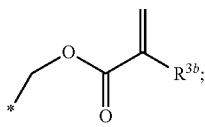
(V)

$R^7$ is hydrogen atom, a straight alkyl group having 1 to 25 carbon atoms or a (meth)acryl group represented by chemical formula (VI)

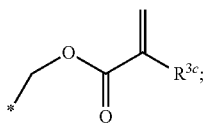
(VI)

wherein $R^{3a}$, $R^{3b}$ and $R^{3C}$ are, each independently or dependently of each other at each occurrence, H or $CH_3$;

wherein at least one of $R^5$, $R^6$ and $R^7$ is a (meth)acryl group, preferably two of $R^5$, $R^6$ and $R^7$ are a (meth)acryl group and other one is a hydrogen atom or a straight alkyl group having 1 to 25 carbon atoms, wherein "*" represents the connecting point to the carbon atom of chemical formula (III).

It is believed that the (meth)acrylate monomer of chemical formula (III) is useful to improve its solidity of a later made from the composition after inkjet printing.

According to the present invention, a publicly known a (meth)acrylate monomer represented by following chemical formula (III) can be used to improve solidity of a layer after inkjet printing and cross linking.

Very preferably, Trimethylolpropane Triacrylate (TMPTA) is used as the (meth)acrylate monomer of chemical formula (III).

In a preferable embodiment of the present invention, the amount of the (meth)acrylate monomer of chemical formula (III) based on the total amount of (meth)acrylate monomers in the composition is in the range from 0.001 wt. % to 25 wt. %, more preferably in the range from 0.1 wt. % to 15 wt. %, even more preferably from 1 wt. % to 10 wt. %, further more preferably from 3 to 7 wt %.

QY Calculation

Quantum Yield (QY) measurements of composition are carried out by using Absolute PL quantum yield spectrometer C9920-02 (Hamamatsu Photonics K. K.), and following formula is used.

Quantum yield (QY)=emitted photon number from the sample/absorbed photon number of the sample.

Use

In another aspect, the present invention relates to use of the composition, in an electronic device, optical device, sensing device or in a biomedical device or for fabricating an electronic device, sensing device, optical device or a biomedical device.

In another aspect, the present invention also relates to use of composition for inkjet printing, preferably for large area inkjet printing.

Optical Element

In another aspect, the present invention further relates to an optical element made from the composition of the present invention.

Optical Medium

In another aspect, the present invention further relates to an optical medium comprising one or more of said optical elements. Preferably, said optical medium comprises a plurality of the optical elements. For examples, said optical medium comprises a plurality of red, green and blue pixels (red, green and blue optical elements.)

In a preferred embodiment of the present invention, said elements are each separated by bank structure.

In some embodiments of the present invention, the optical medium can be an optical sheet, for example, a color filter, color conversion film, remote phosphor tape, or another film or filter.

According to the present invention, the term "sheet" includes film and/or layer like structured mediums.

In order to enhance out-coupling efficiency from an optical medium comprising the semiconducting light emitting nanoparticle, for example, a quantum sized material containing optical film, several methods are proposed, such as incorporating scattering particles in the film and/or the adjacent films, reduce the refractive index of the film by incorporating hollow silica particles, and placing suitable shape structure (cf. Proceedings of SPIE, P. 184, 5519-33, 2004). Among them, placing the structured film upon the quantum materials containing film is the most suitable for large TV application in which local dimming technique is applied to achieve high dynamic range. The scattering particles are detrimental to the dimming technique, since the scattered light causes a color blur and reducing the refractive index of the film enough for a practical level is difficult because of the limited volume for the hollow silica particles. The combination of reducing the refractive index and placing the structured film can be also applied.

Optical Device

In another aspect, the invention further relates to an optical device comprising the optical medium.

In some embodiments of the present invention, the optical device can be a liquid crystal display device (LCD), Organic Light Emitting Diode (OLED), backlight unit for an optical display, Light Emitting Diode device (LED), Micro Electro Mechanical Systems (here in after "MEMS"), electro wetting display, or an electrophoretic display, a lighting device, and/or a solar cell.

The term "emission" means the emission of electromagnetic waves by electron transitions in atoms and molecules.

Process

In another aspect, the invention also relates to a process for fabricating the composition of the present invention comprising, essentially consisting or consisting of:

A) Mixing at least i) one (meth)acrylate monomer represented by following chemical formula (I) having viscosity of 25 cP or less at 25° C., preferably in the range from 1 to 25 cP, more preferably from 2 to 20 cP, even more preferably from 2 to 10 cP; and

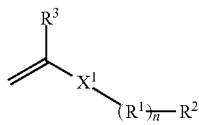
(I)

wherein
X¹ is

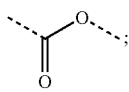

R¹ is a straight alkylene chain or alkoxylene chain having 1 to 15 carbon atoms, preferably 1 to 10 carbon atoms, more preferably 1 to 5 carbon atoms;

n is 0 or 1;

R² is a branched or cyclic alkyl or alkoxy group having 3 to 40 carbon atoms, an aromatic or heteroaromatic ring system having 5 to 60 aromatic ring atoms, which may be substituted by one or more radicals $R^a$;

preferably said cyclic alkyl or alkoxy group is a cyclic alkyl or alkoxy group having 3 to 40 carbon atoms, which may in each case be substituted by one or more radicals $R^a$, where one or more non-adjacent $CH_2$ groups may be replaced by $R^aC=CR^a$, $C\equiv C$, $Si(R^a)_2$, $Ge(R^a)_2$, $Sn(R^a)_2$, $C=O$, $C=S$, $C=Se$, $C=NR^a$, $P(=O)(R^a)$, SO, SO2, $NR^a$, OS, or $CONR^a$ and where one or more H atoms may be replaced by D, F, Cl, Br, I, CN or $NO_2$;

$R^a$ is at each occurrence, identically or differently, H, D, or an alkyl group having 1 to 20 carbon atoms, cyclic alkyl or alkoxy group having 3 to 40 carbon atoms, an aromatic ring system having 5 to 60 carbon ring atoms, or a hetero aromatic ring system having 5 to 60 carbon atoms, wherein H atoms may be replaced by D, F, Cl, Br, I; two or more adjacent substituents $R^a$ here may also form a mono- or polycyclic, aliphatic, aromatic or heteroaromatic ring system with one another;

R³ is H or $CH_3$; and ii) another material to get a composition.

In another aspect, the invention also relates to a process for fabricating the composition of the present invention comprising, essentially consisting or consisting of:

a) Mixing i) at least one (meth)acrylate monomer represented by following chemical formula (I), preferably said (meth)acrylate monomer has the viscosity of 25 cP or less at room temperature, preferably in the range from 1 to 25 cP, more preferably from 2 to 20 cP, even more preferably from 2 to 10 cP;

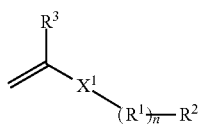
(I)

wherein

X¹ is

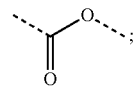

R¹ is a straight alkylene chain or alkoxylene chain having 1 to 15 carbon atoms, preferably 1 to 10 carbon atoms, more preferably 1 to 5 carbon atoms;

n is 0 or 1;

R² is a branched or cyclic alkyl or alkoxy group having 3 to 40 carbon atoms, an aromatic or heteroaromatic ring system having 5 to 60 aromatic ring atoms, which may be substituted by one or more radicals $R^a$;

preferably said cyclic alkyl or alkoxy group is a cyclic alkyl or alkoxy group having 3 to 40 carbon atoms, which may in each case be substituted by one or more radicals $R^a$, where one or more non-adjacent $CH_2$ groups may be replaced by $R^aC=CR^a$, $C\equiv C$, $Si(R^a)_2$, $Ge(R^a)_2$, $Sn(R^a)_2$, $C=O$, $C=S$, $C=Se$, $C=NR^a$, $P(=O)(R^a)$, SO, SO2, $NR^a$, OS, or $CONR^a$ and where one or more H atoms may be replaced by D, F, Cl, Br, I, CN or $NO_2$;

$R^a$ is at each occurrence, identically or differently, H, D, or an alkyl group having 1 to 20 carbon atoms, cyclic alkyl or alkoxy group having 3 to 40 carbon atoms, an aromatic ring system having 5 to 60 carbon ring atoms, or a hetero aromatic ring system having 5 to 60 carbon atoms, wherein H atoms may be replaced by D, F, Cl, Br, I; two or more adjacent substituents $R^a$ here may also form a mono- or polycyclic, aliphatic, aromatic or heteroaromatic ring system with one another;

R³ is H or $CH_3$;

vi) a (meth)acrylate monomer represented by following chemical formula (II),

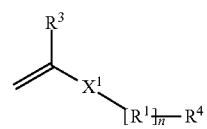
(II)

wherein
X¹ is

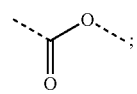

R¹ is a straight alkylene chain or alkoxylene chain having 1 to 15 carbon atoms, preferably 1 to 10 carbon atoms, more preferably 1 to 5 carbon atoms;

n is 0 or 1;

R³ is H or $CH_3$;

R⁴ is a straight alkyl group having 1 to 25 carbon atoms, preferably 5 to 20 carbon atoms, more preferably 10 to 15 carbon atoms; or alkoxyl group having 1 to 25 carbon atoms, preferably 5 to 20 carbon atoms, more preferably 10 to 15 carbon atoms to get a composition.

In another aspect, the invention further relates to a process for fabricating the composition of the present invention comprising, essentially consisting or consisting of:

a) Mixing i) at least one (meth)acrylate monomer represented by following chemical formula (I), preferably said (meth)acrylate monomer has the viscosity of 25 cP or less at room temperature, preferably in the range from 1 to 25 cP, more preferably from 2 to 20 cP, even more preferably from 2 to 10 cP;

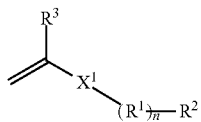
(I)

wherein
X¹ is

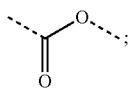

R¹ is a straight alkylene chain or alkoxylene chain having 1 to 15 carbon atoms, preferably 1 to 10 carbon atoms, more preferably 1 to 5 carbon atoms;

n is 0 or 1;

R² is a branched or cyclic alkyl or alkoxy group having 3 to 40 carbon atoms, an aromatic or heteroaromatic ring system having 5 to 60 aromatic ring atoms, which may be substituted by one or more radicals $R^a$; preferably said cyclic alkyl or alkoxy group is a cyclic alkyl or alkoxy group having 3 to 40 carbon atoms, which may in each case be substituted by one or more radicals $R^a$, where one or more non-adjacent $CH_2$ groups may be replaced by $R^aC=CR^a$, $C\equiv C$, $Si(R^a)_2$, $Ge(R^a)_2$, $Sn(R^a)_2$, $C=O$, $C=S$, $C=Se$, $C=NR^a$, $P(=O)(R^a)$, SO, SO2, $NR^a$, OS, or $CONR^a$ and where one or more H atoms may be replaced by D, F, Cl, Br, I, CN or $NO_2$;

$R^a$ is at each occurrence, identically or differently, H, D, or an alkyl group having 1 to 20 carbon atoms, cyclic alkyl or alkoxy group having 3 to 40 carbon atoms, an aromatic ring system having 5 to 60 carbon ring atoms, or a hetero aromatic ring system having 5 to 60 carbon atoms, wherein H atoms may be replaced by D, F, Cl, Br, I; two or more adjacent substituents $R^a$ here may also form a mono- or polycyclic, aliphatic, aromatic or heteroaromatic ring system with one another;

R³ is H or $CH_3$;

iv) at least one polymer, wherein the polymer comprises at least a repeating unit A comprising a phosphine group, phosphine oxide group, phosphate group, phosphonate group, thiol group, tertiary amine, carboxyl group, hetero cyclic group, silane group, sulfonic acid, hydroxyl group, phosphonic acid, or a combination of thereof, preferably the repeating unit A comprises a tertiary amine, phosphine oxide group, phosphonic acid, or a phosphate group; and v') a scattering particle, preferably said scattering particle is selected from one or more members of the group consisting of inorganic oxide particles such as $SiO_2$, $SnO_2$, CuO, CoO, $Al_2O_3$ $TiO_2$, $Fe_2O_3$, $Y_2O_3$, ZnO, ZnS, MgO particles or organic particles such as polymerized polystyrene, polymerized PMMA particles, and inorganic hollow oxide particles such as hollow silica, more preferably it is a $TiO_2$ particle, even more preferably the average diameter of the particle is in the range from 0.25 to 0.20 μm.

more details of (meth)acrylate monomers, another material, polymer and scattering particles are described in the section of "(meth)acrylate monomer", "another material", "polymer" and "scattering particle".

Additional additives as described in the section of "additional material" can be mixed.

According to the present invention, it is desirable not to add any solvent to realize large area inkjet printing with improved uniformity without causing any clogging at a nozzle and/or with good dispersity of semiconducting light emitting nanoparticles and/or with good dispersity of scattering particles.

In another aspect, the present invention also relates to a process of fabricating an element or an optical medium comprising;

X) ink jetting the composition of the present invention onto a substrate.

Y) optionally applying photo curing of (meth)acrylate monomer(s) with UV light irradiation.

PREFERABLE EMBODIMENTS

Embodiment 1. A composition comprising;

i) at least one (meth)acrylate monomer represented by following chemical formula (I) having viscosity of 25 cP or less at 25° C., preferably in the range from 1 to 25 cP, more preferably from 2 to 20 cP, even more preferably from 2 to 10 cP;

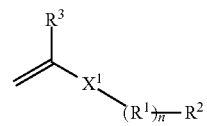
(I)

wherein
X¹ is

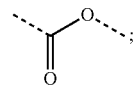

R¹ is a straight alkylene chain or alkoxylene chain having 1 to 15 carbon atoms, preferably 1 to 10 carbon atoms, more preferably 1 to 5 carbon atoms;

n is 0 or 1;

R² is a branched or cyclic alkyl or alkoxy group having 3 to 40 carbon atoms, an aromatic or heteroaromatic ring system having 5 to 60 aromatic ring atoms, which may be substituted by one or more radicals $R^a$;

preferably said cyclic alkyl or alkoxy group is a cyclic alkyl or alkoxy group having 3 to 40 carbon atoms, which may in each case be substituted by one or more radicals $R^a$, where one or more non-adjacent $CH_2$ groups may be replaced by $R^aC=CR^a$, $C\equiv C$, $Si(R^a)_2$, $Ge(R^a)_2$, $Sn(R^a)_2$, $C=O$, $C=S$, $C=Se$, $C=NR^a$, $P(=O)(R^a)$, SO, SO2, $NR^a$, OS, or $CONR^a$ and where one or more H atoms may be replaced by D, F, Cl, Br, I, CN or $NO_2$;

$R^a$ is at each occurrence, identically or differently, H, D, or an alkyl group having 1 to 20 carbon atoms, cyclic alkyl or alkoxy group having 3 to 40 carbon atoms, an aromatic ring system having 5 to 60 carbon ring atoms, or a hetero aromatic ring system having 5 to 60 carbon atoms, wherein H atoms may be replaced by D, F, Cl, Br, I; two or more adjacent substituents $R^a$ here may also form a mono- or polycyclic, aliphatic, aromatic or heteroaromatic ring system with one another;

$R^3$ is H or $CH_3$; and ii) another material.

Embodiment 2. The composition of embodiment 1, wherein the boiling point (B.P.) of said (meth)acrylate monomer is 180° C. or more, preferably it is in the range from 180° C. to 350° C., more preferably from 250° C. to 350° C.

Embodiment 3. A composition comprising;
i) at least one (meth)acrylate monomer represented by following chemical formula (I), preferably said (meth) acrylate monomer has the viscosity of 25 cP or less at room temperature, preferably in the range from 1 to 25 cP, more preferably from 2 to 20 cP, even more preferably from 2 to 10 cP;

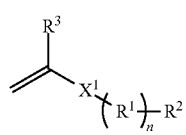

(I)

wherein
$X^1$ is

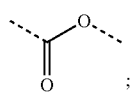

;

$R^1$ is a straight alkylene chain or alkoxylene chain having 1 to 15 carbon atoms, preferably 1 to 10 carbon atoms, more preferably 1 to 5 carbon atoms;

n is 0 or 1;

$R^2$ is a branched or cyclic alkyl or alkoxy group having 3 to 40 carbon atoms, an aromatic or heteroaromatic ring system having 5 to 60 aromatic ring atoms, which may be substituted by one or more radicals $R^a$; preferably said cyclic alkyl or alkoxy group is a cyclic alkyl or alkoxy group having 3 to 40 carbon atoms, which may in each case be substituted by one or more radicals $R^a$, where one or more non-adjacent $CH_2$ groups may be replaced by $R^aC=CR^a$, $C\equiv C$, $Si(R^a)_2$, $Ge(R^a)_2$, $Sn(R^a)_2$, C=O, C=S, C=Se, $C=NR^a$, $P(=O)(R^a)$, SO, SO2, $NR^a$, OS, or $CONR^a$ and where one or more H atoms may be replaced by D, F, Cl, Br, I, CN or $NO_2$;

$R^a$ is at each occurrence, identically or differently, H, D, or an alkyl group having 1 to 20 carbon atoms, cyclic alkyl or alkoxy group having 3 to 40 carbon atoms, an aromatic ring system having 5 to 60 carbon ring atoms, or a hetero aromatic ring system having 5 to 60 carbon atoms, wherein H atoms may be replaced by D, F, Cl, Br, I; two or more adjacent substituents $R^a$ here may also form a mono- or polycyclic, aliphatic, aromatic or heteroaromatic ring system with one another;

$R^3$ is H or $CH_3$, vi) a (meth)acrylate monomer represented by following chemical formula (II)

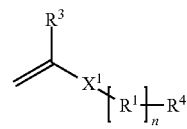

(II)

wherein
$X^1$ is

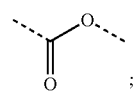

;

$R^1$ is a straight alkylene chain or alkoxylene chain having 1 to 15 carbon atoms, preferably 1 to 10 carbon atoms, more preferably 1 to 5 carbon atoms;

n is 0 or 1;

$R^3$ is H or $CH_3$;

$R^4$ is a straight alkyl group having 1 to 25 carbon atoms, preferably 5 to 20 carbon atoms, more preferably 10 to 15 carbon atoms; or alkoxyl group having 1 to 25 carbon atoms, preferably 5 to 20 carbon atoms, more preferably 10 to 15 carbon atoms.

Embodiment 4. The composition of embodiment 3, wherein the mixing ratio of the (meth)acrylate monomer of chemical formula (I) and the (meth)acrylate monomer of chemical formula (II) is in the range from 11:89 to 99:1, preferably from 20:80 to 90:10.

Embodiment 5. The composition of embodiment 3 or 4, wherein the boiling point (B.P.) of said (meth)acrylate monomer of chemical formula (I) and/or chemical formula (II) is 118° C. or more, preferably it is in the range from 118° C. to 350° C., more preferably from 120° C. to 350° C., even more preferably from 140° C. to 350° C.

Embodiment 6. The composition of any one of embodiments 1 to 5, comprises an another material selected from one or more members of the group consisting of;
iii) at least one semiconducting light emitting nanoparticle comprising a $1^{st}$ semiconducting nanoparticle, optionally one or more shell layers covering at least a part of the $1^{st}$ semiconducting nanoparticle;
iv) at least one polymer,
wherein the polymer comprises at least a repeating unit A comprising a phosphine group, phosphine oxide group, phosphate group, phosphonate group, thiol group, tertiary amine, carboxyl group, hetero cyclic group, silane group, sulfonic acid, hydroxyl group, phosphonic acid, or a combination of thereof, preferably the repeating unit A comprises a tertiary amine, phosphine oxide group, phosphonic acid, or a phosphate group;
v) scattering particles, optically transparent polymers, anti-oxidants, radical quenchers, photo initiators and surfactants.

Embodiment 7. A composition comprising;
i) at least one (meth)acrylate monomer represented by following chemical formula (I), preferably said (meth) acrylate monomer has the viscosity of 25 cP or less at room temperature, preferably in the range from 1 to 25 cP, more preferably from 2 to 20 cP, even more preferably from 2 to 10 cP;

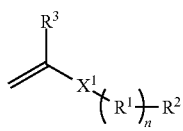

(I)

wherein
X¹ is

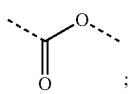

R¹ is a straight alkylene chain or alkoxylene chain having 1 to 15 carbon atoms, preferably 1 to 10 carbon atoms, more preferably 1 to 5 carbon atoms;
n is 0 or 1;
R² is a branched or cyclic alkyl or alkoxy group having 3 to 40 carbon atoms, an aromatic or heteroaromatic ring system having 5 to 60 aromatic ring atoms, which may be substituted by one or more radicals R$^a$; preferably said cyclic alkyl or alkoxy group is a cyclic alkyl or alkoxy group having 3 to 40 carbon atoms, which may in each case be substituted by one or more radicals R$^a$, where one or more non-adjacent CH$_2$ groups may be replaced by R$^a$C=CR$^a$, C≡C, Si(R$^a$)$_2$, Ge(R$^a$)$_2$, Sn(R$^a$)$_2$, C=O, C=S, C=Se, C=NR$^a$, P(=O)(R$^a$), SO, SO2, NR$^a$, OS, or CONR$^a$ and where one or more H atoms may be replaced by D, F, Cl, Br, I, CN or NO$_2$;
R$^a$ is at each occurrence, identically or differently, H, D, or an alkyl group having 1 to 20 carbon atoms, cyclic alkyl or alkoxy group having 3 to 40 carbon atoms, an aromatic ring system having 5 to 60 carbon ring atoms, or a hetero aromatic ring system having 5 to 60 carbon atoms, wherein H atoms may be replaced by D, F, Cl, Br, I; two or more adjacent substituents R$^a$ here may also form a mono- or polycyclic, aliphatic, aromatic or heteroaromatic ring system with one another; R³ is H or CH$_3$;
iv) at least one polymer,
wherein the polymer comprises at least a repeating unit A comprising a phosphine group, phosphine oxide group, phosphate group, phosphonate group, thiol group, tertiary amine, carboxyl group, hetero cyclic group, silane group, sulfonic acid, hydroxyl group, phosphonic acid, or a combination of thereof, preferably the repeating unit A comprises a tertiary amine, phosphine oxide group, phosphonic acid, or a phosphate group;
and
v') a scattering particle, preferably said scattering particle is selected from one or more members of the group consisting of inorganic oxide particles such as SiO$_2$, SnO$_2$, CuO, CoO, Al$_2$O$_3$ TiO$_2$, Fe$_2$O$_3$, Y$_2$O$_3$, ZnO, ZnS, MgO particles or organic particles such as polymerized polystyrene, polymerized PMMA particles, and inorganic hollow oxide particles such as hollow silica, more preferably it is a TiO$_2$ particle, even more preferably the average diameter of the particle is in the range from 0.25 to 0.20 μm.
Embodiment 8. The composition of any one of embodiments 1 to 7, wherein the composition further comprises a (meth)acrylate monomer represented by following chemical formula (Ill);

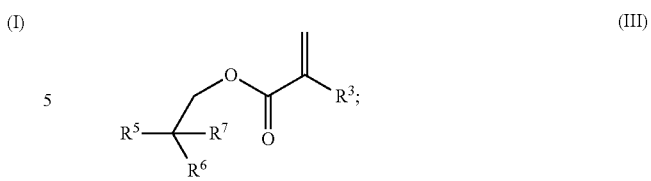

(III)

wherein R⁵ is hydrogen atom, a straight alkyl group having 1 to 25 carbon atoms or a (meth)acryl group represented by chemical formula (IV)

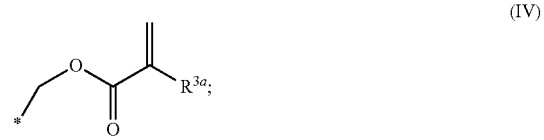

(IV)

R⁶ is hydrogen atom, a straight alkyl group having 1 to 25 carbon atoms or a (meth)acryl group represented by chemical formula (V)

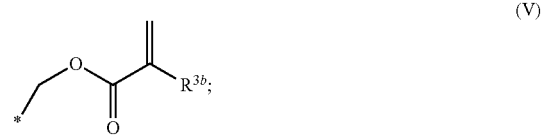

(V)

R⁷ is hydrogen atom, a straight alkyl group having 1 to 25 carbon atoms or a (meth)acryl group represented by chemical formula (VI)

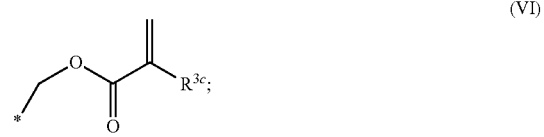

(VI)

wherein R$^{3a}$, R$^{3b}$ and R$^{3c}$ are, each independently or dependently of each other at each occurrence, H or CH$_3$;
wherein at least one of R⁵, R⁶ and R⁷ is a (meth)acryl group, preferably two of R⁵, R⁶ and R⁷ are a (meth) acryl group and other one is a hydrogen atom or a straight alkyl group having 1 to 25 carbon atoms.
Embodiment 9. The composition according to any one of embodiments 1 to 8, is a solvent free composition, preferably the composition does not comprise any one of the following solvent selected from one or more members of the group consisting of ethylene glycol monoalkyl ethers, such as, ethylene glycol monomethyl ether, ethylene glycol monoethyl ether, ethylene glycol monopropyl ether, and ethylene glycol monobutyl ether; diethylene glycol dialkyl ethers, such as, diethylene glycol dimethyl ether, diethylene glycol diethyl ether, diethylene glycol dipropyl ether, and diethylene glycol dibutyl ether; propylene glycol monoalkyl ethers, such as, propylene glycol monomethyl ether (PGME), propylene glycol monoethyl ether, and propylene glycol monopropyl ether; ethylene glycol alkyl ether acetates, such as, methyl cellosolve acetate and ethyl cellosolve acetate; propylene glycol alkyl ether acetates, such as, propylene glycol monomethyl ether acetate (PGMEA), propylene glycol monoethyl ether acetate, and propylene glycol monopropyl ether acetate; ketones, such as, methyl ethyl ketone, acetone, methyl amyl ketone, methyl isobutyl ketone, and cyclohexanone; alcohols, such as, ethanol, propanol, butanol, hexanol, cyclo hexanol, ethylene glycol, and glycerin; esters, such as, ethyl 3-ethoxypropionate, methyl 3-methoxypropionate and ethyl lactate; and cyclic asters, such as, gamma-butyro-lactone; chlorinated hydrocarbons, such as chloroform, dichloromethane, chlorobenzene, and dichlorobenzene, preferably said solvent is propylene glycol alkyl ether acetates, alkyl acetates, ethylene glycol monoalkyl ethers, propylene glycol, and propylene glycol monoalkyl ethers.

Embodiment 10. The composition according to any one of embodiments 1 to 9, comprising at least the (meth)acrylate monomer of chemical formula (I), the (meth)acrylate monomer of chemical formula (II) and the (meth)acrylate monomer of chemical formula (III), and the mixing ratio of the (meth)acrylate monomer of chemical formula (I):the (meth)acrylate monomer of chemical formula (II):the (meth)acrylate monomer of chemical formula (III) is 10:89:1 to 50:40:10, preferably in the range from 15:82:3 to 30:60:10.

Embodiment 11. The composition of any one of preceding embodiments, wherein the repeating unit A comprises a tertiary amine represented by following chemical formula (VII), $$NR^4R^5R^6— \quad (VII)$$

wherein $R^4$ is a hydrogen atom, a straight or a branched alkyl group having 1 to 30 carbon atoms, or an aryl group having 1 to 30 carbon atoms; $R^5$ is a hydrogen atom, a straight or a branched alkyl group having 1 to 30 carbon atoms, or an aryl group having 1 to 30 carbon atoms; $R^4$ and $R^5$ can be same or different of each other; $R^6$ is a single bond, a straight or a branched alkylene group having 1 to 30 carbon atoms, alkenylene group having 1 to 30 carbon atoms, (poly)oxaalkylene group having 1 to 30 carbon atoms.

Embodiment 12. The composition according to any one of preceding embodiments, wherein the polymer is a copolymer selected from the group consisting of graft copolymers, block copolymers, alternating copolymers, and random copolymers, preferably said copolymer comprises the repeating unit A, and repeating unit B that does not include any phosphine group, phosphine oxide group, phosphate group, phosphonate group, thiol group, tertiary amine, carboxyl group, hetero cyclic group, silane group, sulfonic acid, hydroxyl group, phosphonic acid, and a combination of thereof, more preferably the copolymer is a block copolymer represented by following chemical formula (VIII) or (IX), $$A_n\text{-}B_m \quad (VIII)$$

$$B_o\text{-}A_n\text{-}B_m \quad (IX)$$

wherein the symbol "A" represents a repeating unit A; the symbol "B" is taken to mean the repeating unit B; the symbols "n", "m", and "o" are at each occurrence, independently or dependently of each other, integers 1 to 100, preferably 5 to 75, more preferably 10 to 50; even more preferably the repeating unit B comprises a polymer chain selected from the group consisting of (poly)ethylene, (poly)phenylene, polydivinylbenzene, (poly)ethers, (poly)esters, (poly)amides, (poly)urethanes, (poly)carbonates, polylactic acids, (poly)vinyl esters, (poly)vinyl ethers, polyvinyl alcohols, polyvinylpyrrolidones, celluloses and derivatives of any of these.

Embodiment 13. The composition according to any one of preceding embodiments, the $1^{st}$ semiconducting material comprises at least one element of the group 13 of the periodic table, and one element of the group 15 of the periodic table, preferably the element of the group 13 is In, and the element of the group 15 is P, more preferably the $1^{st}$ semiconducting material is selected from the group consisting of InP, InPZn, InPZnS, InPZnSe, InPZnSeS, InPZnGa, InPGaS, InPGaSe, InPGaSeS, InPZnGaSeS and InPGa.

Embodiment 14. The composition according to any one of preceding embodiments, wherein at least one of the shell layers comprises a $1^{st}$ element of group 12 of the periodic table, preferably the $1^{st}$ element is Zn or Cd,
and a $2^{nd}$ element of group 16 of the periodic table, preferably the $2^{nd}$ element is S, Se, or Te.

Embodiment 15. The composition according to any one of preceding embodiments, wherein at least one shell layer is represented by following formula (XI), $$ZnS_xSe_yTe_z, \quad (XI)$$

wherein $0 \leq x \leq 1$, $0 \leq y \leq 1$, $0 \leq z \leq 1$, and $x+y+z=1$, preferably $0 \leq x \leq 1$, $0 \leq y \leq 1$, $z=0$, and $x+y=1$.

Embodiment 16. The composition according to any one of preceding embodiments, wherein said shell layers of the semiconducting light emitting nanoparticle are double shell layers.

Embodiment 17. The composition according to any one of preceding embodiments,
wherein the composition further comprises at least a second additional material, preferably the additional material is selected from the group consisting of organic light emitting materials, inorganic light emitting materials, charge transporting materials, optically transparent polymers, anti-oxidants, radical quenchers, photo initiators and surfactants.

Embodiment 18. The composition according to any one of preceding embodiments, wherein the composition comprises a plurality of semiconducting light emitting nanoparticles.

Embodiment 19. The composition according to any one of preceding embodiments, wherein the total amount of the semiconducting light emitting nanoparticles is in the range from 0.1 wt. % to 90 wt. % based on the total amount of the composition, preferably from 10 wt. % to 70 wt. %, more preferably from 30 wt. % to 50 wt. %.

Embodiment 20. Use of the composition according to any one of preceding embodiments, in an electronic device, optical device, sensing device or in a biomedical device or for fabricating an electronic device, sensing device, optical device or a biomedical device.

Embodiment 21. An optical element made from the composition according to any one of embodiments 1 to 19.

Embodiment 22. An optical medium comprising one or more of said optical element according to embodiment 21.

Embodiment 23. An optical device comprising at least one optical medium of embodiment 22.

Embodiment 24. Process for fabricating the composition of any one of embodiments 1 to 2, 6, 8-19, comprising, essentially consisting or consisting of:
B) Mixing at least i) one (meth)acrylate monomer represented by following chemical formula (I) having viscosity of 25 cP or less at 25° C., preferably in the range from 1 to 25 cP, more preferably 2 to 20 cP, even more preferably from 2 to 10 cP; and

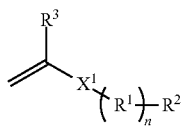

wherein $X^1$ is

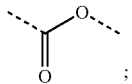

$R^1$ is a straight alkylene chain or alkoxylene chain having 1 to 15 carbon atoms, preferably 1 to 10 carbon atoms, more preferably 1 to 5 carbon atoms;

n is 0 or 1;

$R^2$ is a branched or cyclic alkyl or alkoxy group having 3 to 40 carbon atoms, an aromatic or heteroaromatic ring system having 5 to 60 aromatic ring atoms, which may be substituted by one or more radicals $R^a$; preferably said cyclic alkyl or alkoxy group is a cyclic alkyl or alkoxy group having 3 to 40 carbon atoms, which may in each case be substituted by one or more radicals $R^a$, where one or more non-adjacent $CH_2$ groups may be replaced by $R^aC=CR^a$, C≡C, $Si(R^a)_2$, $Ge(R^a)_2$, $Sn(R^a)_2$, C=O, C=S, C=Se, C=$NR^a$, P(=O)($R^a$), SO, SO2, $NR^a$, OS, or $CONR^a$ and where one or more H atoms may be replaced by D, F, Cl, Br, I, CN or $NO_2$;

$R^a$ is at each occurrence, identically or differently, H, D, or an alkyl group having 1 to 20 carbon atoms, cyclic alkyl or alkoxy group having 3 to 40 carbon atoms, an aromatic ring system having 5 to 60 carbon ring atoms, or a hetero aromatic ring system having 5 to 60 carbon atoms, wherein H atoms may be replaced by D, F, Cl, Br, I; two or more adjacent substituents $R^a$ here may also form a mono- or polycyclic, aliphatic, aromatic or heteroaromatic ring system with one another;

$R^3$ is H or $CH_3$; and ii) another material to get a composition.

Embodiment 25. Process for fabricating the composition of any one of embodiments 3-6, 8-19 comprising, essentially consisting or consisting of: a) Mixing i) at least one (meth)acrylate monomer represented by following chemical formula (I), preferably said (meth)acrylate monomer has the viscosity of 25 cP or less at room temperature, preferably in the range from 1 to 25 cP, more preferably from 2 to 20 cP, even more preferably from 2 to 10 cP;

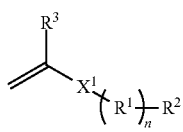

wherein $X^1$ is

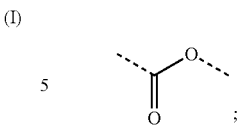

$R^1$ is a straight alkylene chain or alkoxylene chain having 1 to 15 carbon atoms, preferably 1 to 10 carbon atoms, more preferably 1 to 5 carbon atoms;

n is 0 or 1;

$R^2$ is a branched or cyclic alkyl or alkoxy group having 3 to 40 carbon atoms, an aromatic or heteroaromatic ring system having 5 to 60 aromatic ring atoms, which may be substituted by one or more radicals $R^a$; preferably said cyclic alkyl or alkoxy group is a cyclic alkyl or alkoxy group having 3 to 40 carbon atoms, which may in each case be substituted by one or more radicals $R^a$, where one or more non-adjacent $CH_2$ groups may be replaced by $R^aC=CR^a$, C≡C, $Si(R^a)_2$, $Ge(R^a)_2$, $Sn(R^a)_2$, C=O, C=S, C=Se, C=$NR^a$, P(=O)($R^a$), SO, SO2, $NR^a$, OS, or $CONR^a$ and where one or more H atoms may be replaced by D, F, Cl, Br, I, CN or $NO_2$;

$R^a$ is at each occurrence, identically or differently, H, D, or an alkyl group having 1 to 20 carbon atoms, cyclic alkyl or alkoxy group having 3 to 40 carbon atoms, an aromatic ring system having 5 to 60 carbon ring atoms, or a hetero aromatic ring system having 5 to 60 carbon atoms, wherein H atoms may be replaced by D, F, Cl, Br, I; two or more adjacent substituents $R^a$ here may also form a mono- or polycyclic, aliphatic, aromatic or heteroaromatic ring system with one another;

$R^3$ is H or $CH_3$, vi) a (meth)acrylate monomer represented by following chemical formula (II)

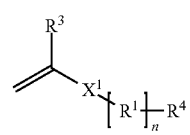

wherein $X^1$ is

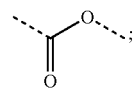

$R^1$ is a straight alkylene chain or alkoxylene chain having 1 to 15 carbon atoms, preferably 1 to 10 carbon atoms, more preferably 1 to 5 carbon atoms;

n is 0 or 1;

$R^3$ is H or $CH_3$;

$R^4$ is a straight alkyl group having 1 to 25 carbon atoms, preferably 5 to 20 carbon atoms, more preferably 10 to 15 carbon atoms; or alkoxyl group having 1 to 25 carbon atoms, preferably 5 to 20 carbon atoms, more preferably 10 to 15 carbon atoms to get a composition.

Embodiment 26. Process for fabricating the composition of any one of embodiments 7-19 comprising, essentially consisting or consisting of: a) Mixing i) at least one (meth)acrylate monomer represented by following chemical formula (I), preferably said (meth)acrylate monomer has the viscosity of 25 cP or less at room temperature, preferably in the range from 1 to 25 cP, more preferably from 2 to 20 cP, even more preferably from 2 to 10 cP;

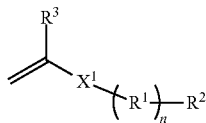
(I)

wherein
X¹ is

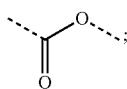

$R^1$ is a straight alkylene chain or alkoxylene chain having 1 to 15 carbon atoms, preferably 1 to 10 carbon atoms, more preferably 1 to 5 carbon atoms;

n is 0 or 1;

$R^2$ is a branched or cyclic alkyl or alkoxy group having 3 to 40 carbon atoms, an aromatic or heteroaromatic ring system having 5 to 60 aromatic ring atoms, which may be substituted by one or more radicals $R^a$; preferably said cyclic alkyl or alkoxy group is a cyclic alkyl or alkoxy group having 3 to 40 carbon atoms, which may in each case be substituted by one or more radicals $R^a$, where one or more non-adjacent $CH_2$ groups may be replaced by $R^aC=CR^a$, C≡C, $Si(R^a)_2$, $Ge(R^a)_2$, $Sn(R^a)_2$, C=O, C=S, C=Se, C=$NR^a$, P(=O)($R^a$), SO, SO2, $NR^a$, OS, or $CONR^a$ and where one or more H atoms may be replaced by D, F, Cl, Br, I, CN or $NO_2$;

$R^a$ is at each occurrence, identically or differently, H, D, or an alkyl group having 1 to 20 carbon atoms, cyclic alkyl or alkoxy group having 3 to 40 carbon atoms, an aromatic ring system having 5 to 60 carbon ring atoms, or a hetero aromatic ring system having 5 to 60 carbon atoms, wherein H atoms may be replaced by D, F, Cl, Br, I; two or more adjacent substituents $R^a$ here may also form a mono- or polycyclic, aliphatic, aromatic or heteroaromatic ring system with one another; $R^3$ is H or $CH_3$;

iv) at least one polymer, wherein the polymer comprises at least a repeating unit A comprising a phosphine group, phosphine oxide group, phosphate group, phosphonate group, thiol group, tertiary amine, carboxyl group, hetero cyclic group, silane group, sulfonic acid, hydroxyl group, phosphonic acid, or a combination of thereof, preferably the repeating unit A comprises a tertiary amine, phosphine oxide group, phosphonic acid, or a phosphate group; and v') a scattering particle, preferably said scattering particle is selected from one or more members of the group consisting of inorganic oxide particles such as $SiO_2$, $SnO_2$, CuO, CoO, $Al_2O_3$ $TiO_2$, $Fe_2O_3$, $Y_2O_3$, ZnO, ZnS, MgO particles or organic particles such as polymerized polystyrene, polymerized PMMA particles, and inorganic hollow oxide particles such as hollow silica, more preferably it is a $TiO_2$ particle, even more preferably the average diameter of the particle is in the range from 0.25 to 0.20 μm.

more details of (meth)acrylate monomers, another material, polymer and scattering particles are described in the section of "(meth)acrylate monomer", "another material", "polymer" and "scattering particle".

Additional additives as described in the section of "additional material" can be mixed.

According to the present invention, it is desirable not to add any solvent to realize large area inkjet printing with improved uniformity without causing any clogging at a nozzle and/or with good dispersity of semiconducting light emitting nanoparticles and/or with good dispersity of scattering particles.

Embodiment 27. Process of fabricating an element or an optical medium comprising;

X) ink jetting the composition of any one of embodiments 1 to 19 onto a substrate.

Y) optionally applying photo curing of (meth)acrylate monomer(s) with UV light irradiation.

Technical Effects of the Invention

Present invention provides one or more of the following effects: improved homogeneous dispersion of semiconducting light emitting nanoparticles in the composition, improved homogeneous dispersion of scattering particles in the composition, preferably improved homogeneous dispersion of both semiconducting light emitting nanoparticles and scattering particles, more preferably improved homogeneous dispersion of semiconducting light emitting nanoparticles and/or scattering particles without solvent; composition having lower viscosity suitable for inkjet printing, preferably a composition which can keep lower viscosity even if it is mixed with high loading of semiconducting light emitting nanoparticles and/or scattering particles, even more preferably without solvent; composition having lower vaper pressure for large area uniform printing; improved QY of semiconducting light emitting nanoparticles in the composition, improved QY of semiconducting light emitting nanoparticles after printing; improved thermal stability; easy printing without clogging at a printing nozzle; easy handling of the composition, improved printing properties; simple fabrication process; improved absorbance of blue light; improved solidity of a later made from the composition after inkjet printing.

The working examples 1-5 below provide descriptions of the present invention, as well as an in-detail description of their fabrication.

WORKING EXAMPLES

Working Example 1: Preparation of Monomer Mixture Ink Composition with 40 wt % of Green Cd-Free QM 2.85 g of 4-tert-butylcyclohexyl acrylate (TBCH, from BASF), 2.85 g of lauryl acrylate (LA, from Sigma Aldrich), and 0.3 g of trimethylolpropane triacrylate (TMPTA, from Sigma Aldrich) are mixed, and 0.01 g of dispersing agent (DISPERBYK-111, BYK) is dispersed into the obtained mixture by sonicating. Then 0.5 g of scattering beads (CR-67, Ishihara Sangyo) is mixed with the obtained mixture by sonicating and milling with zirconium beads. 42 ml of green Cd-free QM toluene solution (Merck), containing 4.0 g of solid QM, and 0.1 g of photo-initiator (Omnirad 819, IGM RESINS B.V.) are mixed with the obtained mixture by sonicating, and toluene is evaporated at 40 deg. C. under low pressure.

For ink-jetting by printer (Dimatix DMP-2831), degasification of the resulting ink composition is performed in desiccator by vacuum pump. The degassed ink is filled into a cartridge tank with 5.0 um-pore size filter.

Comparative Example 1: Preparation of Single Monomer, which has Little Compatibility with Long-Chain Aliphatic Structure, with 40 wt % of Green Cd-Free QM 0.01 g of dispersing agent (DISPERBYK-111, BYK) is dispersed into 6.0 g of Tetrahydrofurfuryl acrylate (THFA) (Sigma Aldrich, BP: 87° C.) by sonicating. Then 0.5 g of scattering beads (CR-67, Ishihara Sangyo) is mixed with the obtained mixture by sonicating and milling with zirconium beads. 42 ml of green Cd-free QM toluene solution (Merck), containing 4.0 g of solid QM, and 0.1 g of photo-initiator (Omnirad 819, IGM RESINS B.V.) are mixed with the obtained mixture by sonicating, and toluene is evaporated at 40 deg. C. under low pressure.

For ink-jetting by a printer (Dimatix DMP-2831), degasification of the resulting ink is performed in desiccator by vacuum pump. The degassed ink is filled into a cartridge tank with 5.0 um-pore size filter.

Working Example 2: Preparation of Monomer Mixture Ink Composition with 40 wt % of Green Cd-Free QM the ink composition is prepared in the same manner as described in the working example 1 except for that the MD1000 was used instead of BYK-111 (Ishihara Sangyo).

As a result, the scattering beads (CR-67, Ishihara Sangyo) are more homogeneously dispersed in the composition over a long term period than the results of working example 1.

Working Example 3: Preparation of Monomer Mixture Ink Composition with 40 wt % of Green Cd-Free QM The ink composition is prepared in the same manner as described in the working example 1 except for that the MD1100 was used instead of BYK-111 (Ishihara Sangyo).

As a result, the scattering beads (CR-67, Ishihara Sangyo) are more homogeneously dispersed in the composition over a long term period than the results of working example 1.

Working Example 4

Optical Observation of the Composition

Fluorescent microscopic photo images of the samples from working example 1 and comparative example 1 are created by OLYMPUS BX-51 equipped with fluorescent mirror unit U-MWIB3.

Table 1 shows the results of the observation.

TABLE 1

| Sample name | Aggregation of the quantum materials in a film |
|---|---|
| Working example 1 | No aggregation Homogeneous dispersion |
| Comparative example 1 | Turbid |

Working Example 5

Ink Jetting and Optical Observation

Ink jetting is carried out by using Dimatix DMP-2831 with the printing condition (Printing voltage: 33V; Pulse Width: 2.5 μsec, at room temperature) to the glass substrate having fine pixel pattern (230 μm*74 μm).

Table 2 shows the results ink jetting of the composition

TABLE 2

| Sample name | Printing results |
|---|---|
| Working example 1 | Fine patterning |

The invention claimed is:

1. A composition comprising:

i) at least one (meth)acrylate monomer represented by formula (I);

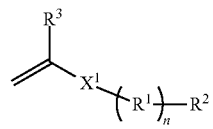

(I)

wherein
$X^1$ is

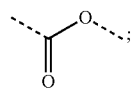

n is 0 or 1;
$R^1$ is a straight alkylene chain having 1 to 15 carbon atoms;
$R^2$ is a branched or cyclic alkyl, or an aromatic or heteroaromatic ring system having 5 to 60 aromatic ring atoms, which is unsubstituted or substituted by one or more radicals $R^a$;
$R^a$ is at each occurrence, identically or differently, H, D, or an alkyl group having 1 to 20 carbon atoms, cyclic alkyl or alkoxy group having 3 to 40 carbon atoms, an aromatic ring system having 5 to 60 carbon ring atoms, or a hetero aromatic ring system having 5 to 60 carbon atoms, wherein in each case one or more H atoms can each, independently, be optionally replaced by D, F, Cl, Br, or I, and wherein two or more adjacent substituents $R^a$ can also form a mono- or polycyclic, aliphatic, aromatic or heteroaromatic ring system with one another; and
$R^3$ is H or $CH_3$;

ii) a (meth)acrylate monomer represented by formula (II)

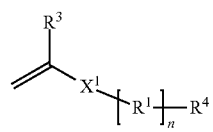

(II)

wherein $X^1$ is

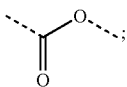

$R^1$ is a straight alkylene chain having 1 to 15 carbon atoms;

n is 0 or 1;

$R^3$ is H or $CH_3$; and $R^4$ is a straight alkyl group having 1 to 25 carbon atoms; and iii) at least one semiconducting light emitting nanoparticle comprising a first semiconducting nanoparticle and, optionally, one or more shell layers covering at least a part of the first semiconducting nanoparticle, wherein the total amount of the semiconducting light emitting nanoparticles is in the range from 10 wt. % to 90 wt. % based on the total amount of the composition.

2. The composition of claim 1, wherein the ratio of (meth)acrylate monomer of formula (I) and (meth)acrylate monomer of formula (II) is in the range from 11:89 to 99:1.

3. The composition of claim 1, wherein the boiling point (B.P.) of said (meth)acrylate monomer of formula (I) and/or formula (II) is 118° C. or more.

4. The composition of claim 1, wherein the composition further comprises a (meth)acrylate monomer represented by formula (III);

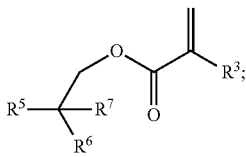

(III)

wherein $R^5$ is hydrogen atom, a straight alkyl group having 1 to 25 carbon atoms or a (meth)acryl group represented by formula (IV)

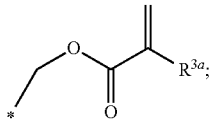

(IV)

$R^6$ is hydrogen atom, a straight alkyl group having 1 to 25 carbon atoms or a (meth)acryl group represented by formula (V)

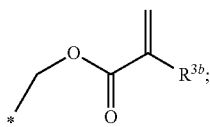

(V)

and $R^7$ is hydrogen atom, a straight alkyl group having 1 to 25 carbon atoms or a (meth)acryl group represented by formula (VI)

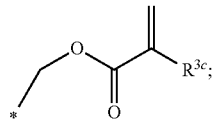

(VI)

wherein $R^{3a}$, $R^{3b}$ and $R^{3c}$ are each, independently or dependently of each other, at each occurrence, H or $CH_3$;

wherein $R^5$, $R^6$ and $R^7$ are each, independently, a hydrogen atom, a straight alkyl group having 1 to 25 carbon atoms, or a (meth)acryl group wherein at least one of $R^5$, $R^6$ and $R^7$ is a (meth)acryl group.

5. The composition of claim 1, wherein said at least one (meth)acrylate monomer of formula (I) has a viscosity of 25 cP or less at room temperature.

6. The composition of claim 1, wherein said at least one (meth)acrylate monomer of formula (I) has a viscosity of from 2 to 20 cP at room temperature.

7. The composition of claim 1, wherein $R^2$ is a cyclic alkyl which in each case is unsubstituted or substituted by one or more radicals $R^a$, where one or more non-adjacent $CH_2$ groups can each be replaced by $R^aC=CR^a$, C=C, $Si(R^a)_2$, $Ge(R^a)_2$, $Sn(R^a)_2$, C=O, C=S, C=Se, C=$NR^a$, P(=O)($R^a$), SO, SO2, $NR^a$, OS, or $CONR^a$ and where one or more H atoms may can each optionally be replaced by D, F, Cl, Br, I, CN or $NO_2$.

8. The composition of claim 1, wherein the mixing ratio of the (meth)acrylate monomer of chemical formula (I) and the (meth)acrylate monomer of chemical formula (II) is in the range 20:80 to 90:10.

9. The composition of claim 1, wherein the boiling point (B.P.) of said (meth)acrylate monomer of chemical formula (I) and/or chemical formula (II) is in the range from 118° C. to 350° C.

10. The composition of claim 1, wherein $R^4$ of formula (II) is selected from *—$(CH_2)_6$—$CH_3$, *—$(CH_2)_7$—$CH_3$, *—$(CH_2)_8$—$CH_3$, *—$(CH_2)_9$—$CH_3$, *—$(CH_2)_{10}$—$CH_3$, *—$(CH_2)_{11}$—$CH_3$, and *—$(CH_2)_{12}$—$CH_3$, wherein "*" represents the connecting point to R in case n is 1, and it is representing the connecting point to oxygen atom of the formula (II) in case n is 0.

11. The composition of claim 1, wherein the at least one (meth)acrylate monomer of formula (I) is lauryl methacrylate or lauryl acrylate.

12. The composition of claim 1, wherein the total amount of the semiconducting light emitting nanoparticles is in the range from 10 wt. % to 70 wt. % based on the total amount of the composition.

13. The composition of claim 1, wherein the total amount of the semiconducting light emitting nanoparticles is in the range from 30 wt. % to 50 wt. % based on the total amount of the composition.

* * * * *